United States Patent [19]

Hirata et al.

[11] Patent Number: 5,220,380
[45] Date of Patent: Jun. 15, 1993

[54] CONTROL SYSTEM FOR COPYING MACHINES WITH IMPROVED COMMUNICATION FUNCTION FOR CENTRALIZED CONTROL UNIT

[75] Inventors: Sumiaki Hirata, Aichi; Kazunobu Maekawa, Toyokawa, all of Japan

[73] Assignee: Minolta Camera Kabushiki Kaisha, Osaka, Japan

[21] Appl. No.: 912,661

[22] Filed: Jul. 14, 1992

Related U.S. Application Data

[63] Continuation of Ser. No. 742,626, Aug. 7, 1991, abandoned.

[30] Foreign Application Priority Data

Aug. 10, 1990 [JP] Japan .................. 2-213275

[51] Int. Cl.⁵ ............................................. G03B 21/00
[52] U.S. Cl. .............................. 355/204; 340/825.51; 358/401; 358/408; 379/96; 379/100
[58] Field of Search ....................... 340/825.5, 825.51; 355/200, 202, 203, 204; 358/400, 401, 402, 403, 404, 405, 406, 407, 408, 468; 379/92, 96, 97, 98, 100

[56] References Cited

U.S. PATENT DOCUMENTS

| | | | |
|---|---|---|---|
| 4,058,672 | 11/1977 | Crager et al. | 358/407 |
| 4,167,322 | 9/1979 | Yano et al. | 355/204 X |
| 4,322,813 | 3/1982 | Howard et al. | 364/900 |
| 4,390,953 | 6/1983 | Johnstone et al. | 364/474 |
| 4,497,037 | 1/1985 | Kato et al. | 364/900 |
| 4,583,834 | 4/1986 | Seko et al. | 355/206 |
| 4,739,366 | 4/1988 | Braswell et al. | 355/208 |
| 4,766,548 | 8/1988 | Cedrone et al. | 364/479 |
| 4,797,706 | 1/1989 | Sugishima et al. | 355/200 X |
| 4,903,016 | 2/1990 | Murai et al. | 340/825.5 |
| 4,979,132 | 12/1990 | Sugimoto | 364/520 |
| 4,994,926 | 2/1991 | Gordon et al. | 358/400 |
| 4,996,703 | 2/1991 | Gray et al. | 379/40 |
| 5,077,582 | 12/1991 | Kravette et al. | 355/206 |

FOREIGN PATENT DOCUMENTS 54-142559 8/1984 Japan .
63-301667 12/1988 Japan .

OTHER PUBLICATIONS

Lynn S. Ritter, "Remote Diagonostic—Tool Kit of the Future", 1989, pp. 1-6, Dataquest Research Newsletter.

Primary Examiner—Michael L. Gellner
Assistant Examiner—P. Stanzione
Attorney, Agent, or Firm—Burns, Doane, Swecker & Mathis

[57] ABSTRACT

A copying machine control system according to the present invention includes a plurality of data terminals collecting data related to a plurality of copying machines, respectively, a centralized control unit for communicating data with each data terminal through a communication network, and a communication control unit for connecting the plurality of data terminals and the communication network. Each of the data terminals includes a request device for requesting the communication control unit communication with the centralized control unit when predetermined transmission condition including one with high priority and one with low priority is satisfied, a transmitting device for transmitting the priority of the transmission condition to the communication control unit when the predetermined transmission condition is satisfied, and a communication device for communicating with the centralized control unit when communication with the centralized control unit is permitted by the communication control unit. The communication control unit includes a first controller for, when request for communication is caused by only one of the data terminals, permitting the data terminal to communicate with the centralized control unit, and a second controller for, when requests for communication are caused from a plurality of the data terminals, permitting a data terminal having transmission condition with the highest priority to communicate with the centralized control unit.

9 Claims, 24 Drawing Sheets

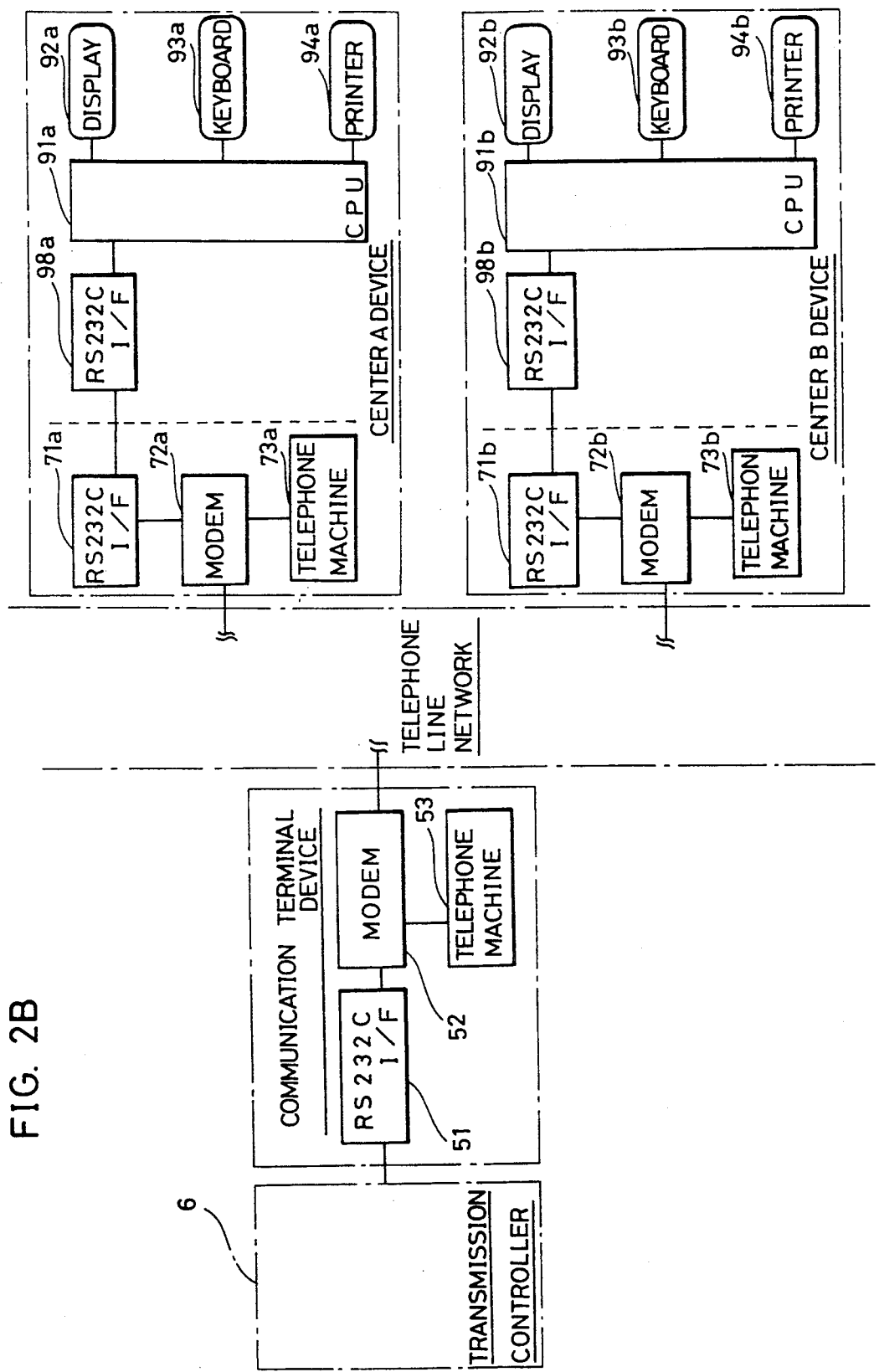

CONTROL SYSTEM FOR COPYING MACHINES WITH IMPROVED COMMUNICATION FUNCTION FOR CENTRALIZED CONTROL UNIT

This application is a continuation of application Ser. No. 07/742,626, filed Aug. 7, 1991, now abandoned.

BACKGROUND OF THE INVENTION

1. Field of the Invention

The present invention relates to control systems for copying machines, and particularly to a control system for copying machines in which data for controlling the copying machines are transmitted to a centralized control unit on the center side.

2. Description of the Related Art

A system for controlling a plurality of copying machines is disclosed in U.S. Pat. No. 4,583,834. In this disclosed system, various information of copying machines such as the total number of copies, troubles, remaining quantities of copy sheets and toner are transmitted to a computer. The computer processes the transmitted information and feeds back instructions to the copying machines.

According to such a system, a plurality of copying machines supplied to users are connected to a centralized control unit through a communication network such as telephone lines for remote control of the copying machines. The centralized control unit is provided at a control base, and the controlling party receives with the centralized control unit the information transmitted from respective copying machines. Then, controlling works such as the issue of bills corresponding to the number of copies and dispatch of servicemen corresponding to the troubles are made.

Since general copying machines do not have functions of communicating with a centralized control unit through a communication network, a data terminal is attached to a copying machine for communication when configuring said system. This data terminal collects various information from the copying machine and communicate with the centralized control unit on the basis of the collected information.

When a single user has a plurality of copying machines, a data terminal is provided for each copying machine. However, in consideration of cost and usage efficiency of the line, it is not reasonable to provide a communication line for communication with a centralized control unit for every data terminal.

SUMMARY OF THE INVENTION

It is an object of the present invention to provide a copying machine control system capable of controlling a plurality of copying machines with a common communication line.

It is another object of the present invention to provide a copying machine control system capable of timely control corresponding to the situations of copying machines.

It is still another object of the present invention to provide a copying machine control system capable of communication between a plurality of data terminals and a centralized control unit with less number of communication lines.

In order to achieve the above objects, a control system for copying machines according to the present invention is a copying machine control system including a plurality of data terminals collecting data related to a plurality of copying machines, respectively, a centralized control unit for data communication with each data terminal through a communication network and a communication control unit for connecting the plurality of data terminals and the communication network, in which each data terminal includes a requesting means for requesting the communication control unit communication with the centralized control unit when predetermined transmission conditions, including one with high priority and one with low priority, are satisfied, transmitting means for transmitting the priority of the transmission conditions to the communication control unit when the predetermined transmission conditions are satisfied, and a communicating means for communicating with the centralized control unit when communication with the centralized control unit is permitted by the communication control unit, and the communication control unit includes a first control means for, when a request for communication is made by only one of data terminals, permitting the data terminal to communicate with the centralized control unit, and second control means for, when requests for communication occur from a plurality of data terminals in the data terminals, permitting a data terminal having transmission conditions with the highest priority to communicate with the centralized control unit.

In a copying machine control system configured as described above, when requests for communication occur from a plurality of data terminals, communication with a data terminal with the highest priority is permitted, so that it is made possible to control a plurality of copying machines with shared communication line.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2A and 2B are block diagrams showing circuit configurations of the system shown in FIG. 1.

DESCRIPTION OF THE PREFERRED EMBODIMENTS

The first embodiment of the present invention will be described below.

[1]Structure of Entirety of System

First, referring to FIGS. 1-5, schematic structure of the present system will be described.

The present system includes a large number of user side devices, equipment on a control center side, and a communication line (a telephone) network connecting the above.

Figure 1:
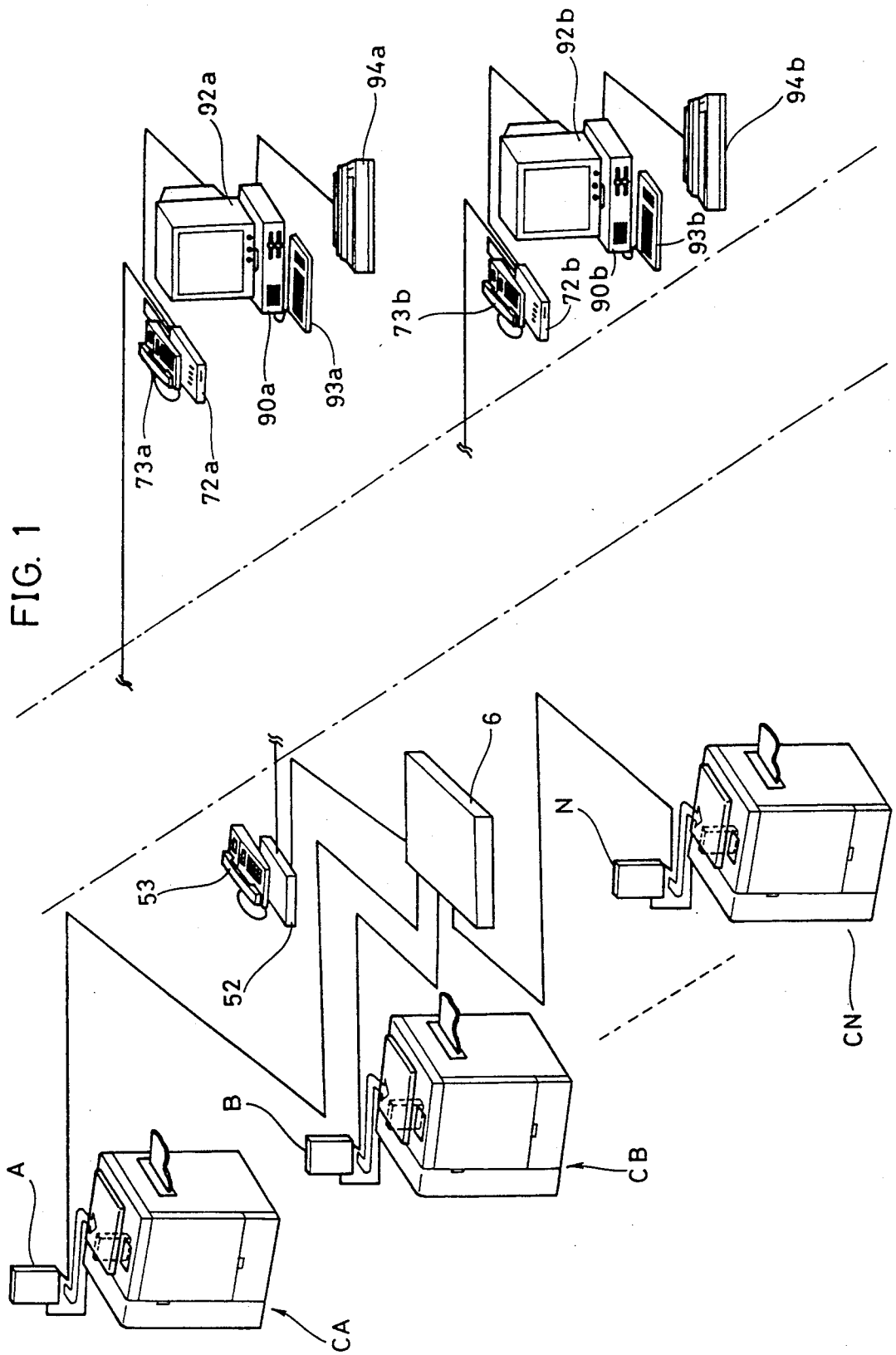
FIG. 1 is a diagram showing structure of a copying machine control system according to the first embodiment of the present invention.
Figure 2A:
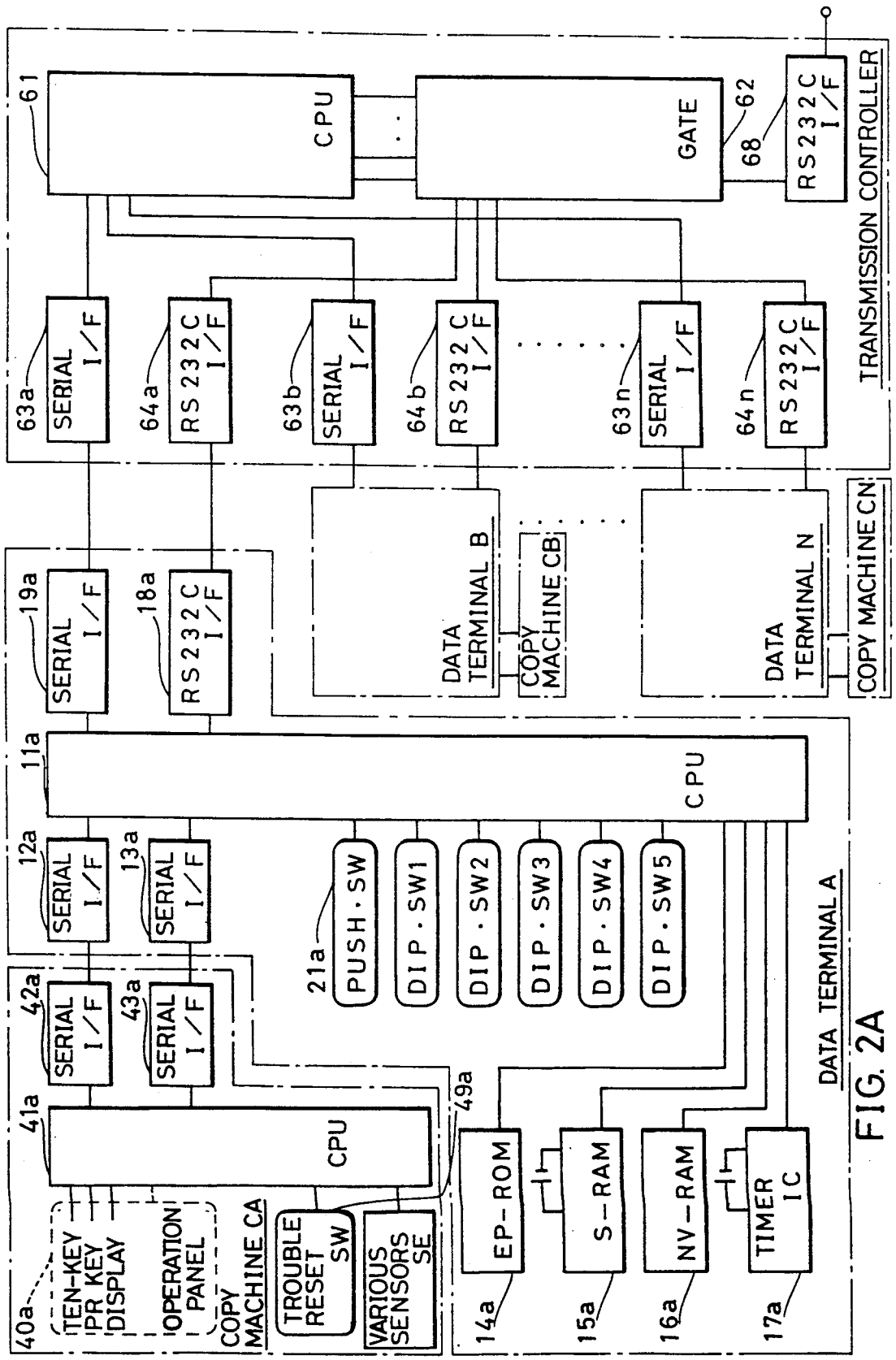

In FIGS. 1, 2A and 2B, a set of user side equipment and two sets of control center side equipment are shown. A single communication terminal device 52 and a single transmission controller 6, a plurality of copying machines CA, CB, ... CN and a plurality of data terminals A, B, ... N corresponding to respective copying machines are provided on each user side. The number of provided copying machines and data terminals is random and differs for each user, but copying machines are shown as CA-CN and data terminals are shown as A-N in the figure. Also, in the description below, for example, CPU 11a means a CPU of a data terminal A and CPU 41a means a CPU of a copying machine CA. That is, a small letter of alphabet indicates a member of a copying machine or a data terminal indicated by a capital letter of that alphabet.

At the same time, two sets of equipment are provided on the control center side. A center A device is used for normal control and a center B device is used for controlling a trouble. In the description below, similarly to the above description, a small letter of alphabet indicates a member of a center device indicated by a capital letter thereof (the center A device or the center B device).

Next, each device will be described.

Copying Machine

A copying machine is a device to form a copied image on paper by original image scanning.

Each of copying machines CA-CN has the same structure. Accordingly, the copying machine CA only is described, and description of other copying machines is not repeated.

In copying machine CA, various kinds of element data having effects upon the image forming process (a time required for paper transport, a surface potential of a photoreceptor drum, a toner concentration in a developer, an amount of exposure of the photoreceptor drum, a developing bias voltage, an amount of toner sticking on photoreceptor drum, a grid voltage of a corona charger, etc.) are detected by a group of various sensors SE, which are taken in and processed in CPU 41, and then transmitted to CPU 11a of corresponding DT A through a serial I/F43a and a serial I/F13a. The above-described various kinds of element data are expressed in an abstract manner as element data $X_i$ (i=1-the number of items of the element data) in the description of flow charts described later.

In copying machine A, each of counted values is counted in each counter as a base of an amount of charge asked from the management side (a total counter indicating the number of times of paper discharge and a counter for each paper size indicating the number of sheets used for each paper size), counters as criteria for maintenance (a JAM counter for each portion indicating the number of jams for each portion, a trouble counter for each portion indicating the number of troubles for each portion, and a PM counter for each part indicating the number of times each part is used), and transmitted to CPU 11a of corresponding data terminal A through serial I/F42a and serial I/F12a. The PM counter is a counter for counting the number of times each part is used, which is a criterion of the time for parts replacement.

Also, copying machine A performs predetermined operation/mode settings with signals from various kinds of key switches on the operation panel (FIG. 4) (a print (PR) key 46a for commanding start of copying operation, a group of ten keys 47a for numerical input, a clear key 48a for commanding to clear input data, etc.), various kinds of switches out of the operation panel (a trouble reset switch 49a for commanding reset of troubles, etc.), and transmits a corresponding signal as needed to CPU 11a of DT A through serial I/F 42a and serial I/F12a. Numerical data displayed in display portion 45a is also included in the transmitted data.

Data Terminal

It is a device which, when data of a connected copying machine is accepted and processed, and predetermined transmission conditions (condition for setting a transmission flag to "1": refer to the description of control described later about the details) are satisfied, activates modem 52 is to connect the communication line to the center A device or the center B device (in an emergency), and transmits various control data (element data, count data, etc.) of the copying machine. Modem 52 is activated through a transmission controller 6 as will be described later.

As shown in FIG. 2A, a controlling CPU 11a of a data terminal A is connected to ROM 14a in which a control program is stored, a non-volatile memory 16a for storing two selection number data of the center A device and the center B device, etc., a S-RAM 15a for works backed up by battery, and a timer IC 17a similarly backed up by a battery, wherein data transmitted from copying machine A is accepted from a serial I/F-12a or a serial I/F13a and subjected to various processings.

The controlling CPU 11a is connected to controlling CPU 61 of transmission controller 6 through serial I/F-19a.serial IF/63a and also connected to a gate 62 through a communication interface (RS232CI/F) 18a.a communication interface (RS232CI/F) 64a.

The controlling CPU 11a executes predetermined operations or setting of modes in response to input of operation switches.

Figure 3:
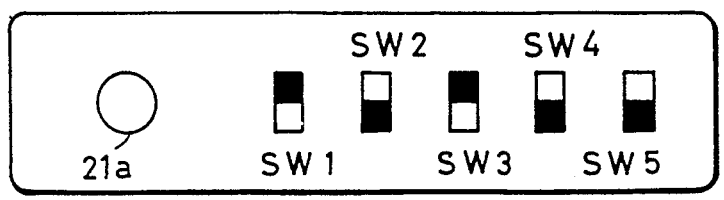
FIG. 3 is a diagram for describing operation switches of the data terminal of FIG. 1.
Figure 4:
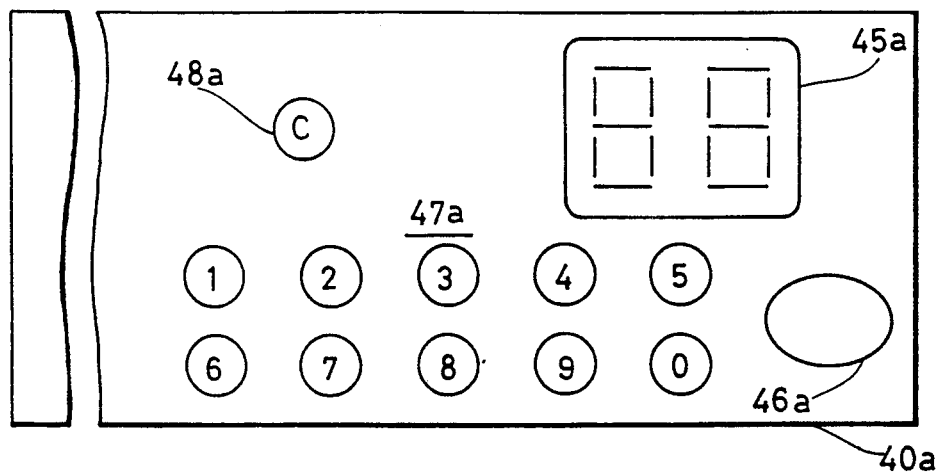
FIG. 4 is a diagram for describing an operation panel of a copying machine to which the data terminal of FIG. 1 is connected.

As above-mentioned operation switches, as shown in FIG. 3, five dip switches DIP.SW1 - DIP.SW 5 and a push switch 21a are provided.

DIP.SW5 is a switch for setting an initialization mode. DIP.SW1 is a switch for setting an input mode of a selection number (telephone number) of the center A device, DIP.SW2 for an ID number (DTID) input mode for identifying data terminal A, DIP.SW3 for a common ID number (center ID) input mode for identifying a center A device and a B device, and DIP.SW4 for a selection number (telephone number) input mode of center B device, respectively. Push switch 21a is a switch for commanding initialization transmission (refer to S155 in FIG. 8B), etc.

The controlling CPU 11a, making an off-hook signal and a selection number signal of the center A device or the center B device at the control center transmitted to the communication network, connects the communication line to modem 72a or 72b of the center A device or the center B device to enable communication with a computer of the center A device or the center B device. When transmission (call for the control center) from other data terminals B-N, which have same structure as the data terminal A, overlap, as will be described later, only a data terminal permitted by transmission controller 6 can activate modem 52. That is, the controlling CPU 11a is connected to gate 62 of the transmission controller through the communication interface (RS232CI/F) 18a on CPU 11a side and the communication interface (RS232CI/F) 64a on the transmission controller 6 side. The gate 62 is connected to modem 52 which is a communication terminal device through the communication interface (RS232CI/F) 68 on the gate 62 side and the communication interface (RS232CI/F) on the modem 52 side. A transmission request signal, a transmission permission signal and so forth are transmitted to the serial I/F19a and the serial I/F63a connecting the controlling CPU 11a and the controlling CPU 61 of the transmission controller 6.

The contents of data transmitted to the control center from each data terminal through the communication network (data for controlling copying machines) are determined by a type of a transmission flag (described later) which is set to "1".

Figure 5:
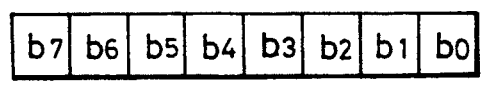
FIG. 5 is a diagram for describing structure of data transmitted to the data terminal from the copying machine of FIG. 1.

FIG. 5 is a diagram showing structure of 8-bit data $b_7$-$b_0$ inputted in DT 1 through serial I/F12. A paper discharge code indicating discharge of paper is expressed as a trailing edge (change from 1 to 0) of bit $b_0$. A JAM code indicating occurrence of a paper jam is expressed as bit $b_7=1$, bit $b_6=0$. A trouble code indicating occurrence of various kinds of troubles is expressed as bit $b_7=1$, $b_6=1$. Furthermore, a position of the paper jam and a type of the trouble are expressed by bit $b_5$-$b_1$. The 8 bit data is periodically inputted in DTI and also inputted when a paper jam or a trouble occurs in a copying machine.

Transmission Controller

When transmissions from a plurality of connected data terminals A-N overlap, it determines priority defined with a type of the transmission, a machine model etc. and first permits a data terminal with high priority to be connected to the control center.

Transmission controller 6 includes, as shown in the figure, a gate 62 for opening and closing connection between the data terminal A-N side and the modem 52 side, and CPU 61 for controlling operation of gate 62.

CPU 61 is connected to serial I/F19a-19n on the data terminals A-N side through serial I/F63a-63n, and transmits to and receives from each data terminal A-N a transmission requesting signal, a transmission permission signal, and a transmission halt signal. It also controls opening/closing of gate 62 on the basis of the received data.

Gate 62 is connected to the communication interfaces (RS232CI/F) 18a-18n on the data terminals A-N side through the communication interfaces (RS232CI/F) 64a-64n, and also connected to modem 52 through the communication interface (RS232CI/F) 68 and the communication interface (RS232CI/F) 51 on the modem 52 side. Thus, a mechanism for connecting only a selected data terminal to modem 52 is implemented.

Center Side Equipment

It is equipment configured to be connected to a large number of user side equipment through the communication network, which includes two sets of equipment as described above (a center A device and a center B device), each of which is configured with a communication terminal device and a computer device. The center A device and the center B device are mutually connected by a communication line (not shown).

The data transmitted from the user side equipment to a modem 72a of the center A device through the communication network are sequentially inputted in a CPU 91a through a communication interface (RS232CI/F) 71a on the modem 72a side and a communication interface (RS232CI/F) 98 on the CPU 91a side. CPU 91a processes the data to produce data for controlling copying machines and also performs printing out of a bill, etc., on the basis of that controlling data. At a fixed time communication time (communication implemented with a fixed time transmission flag set to "1"), a fixed time transmission time data for the next time is transmitted from CPU 91a side to the data terminal side.

Regarding to the center B device, except that the data to be processed is data which requires immediate measure to be taken on the control center side such as data indicating occurrence of a trouble, it is the same as the center A device. That is, the controlling CPU 91b of the center B device processes the received data to grasp the trouble condition of the copying machine and makes instruction as to whether a serviceman should be dispatched or not, and furthermore, makes selection of parts to be prepared in the dispatch, etc. .

[2]System Control

Next, referring to FIGS. 6-19, control of the present system will be described.

Before describing flow charts, the terms "on edge" and "off edge" are defined. The "on edge" is defined to mean a condition change in which conditions of a switch, a sensor, a signal or the like changes from an off state to an on state. The "off-edge" is defined to mean a condition change in which a state of a switch, a sensor, a signal or the like changes from an on state to an off state.

Processes on Copying Machine Side

Figure 6:
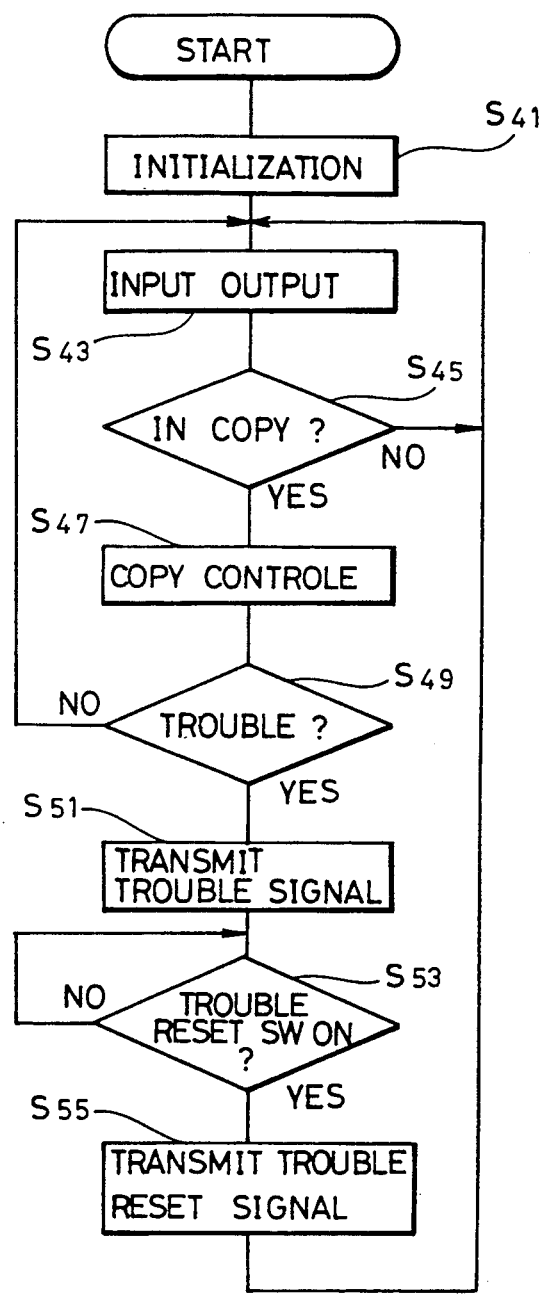
FIG. 6 is a flow chart showing processes by a controlling CPU of the copying machine of FIG. 2A.

First, processings by controlling CPU 41a of copying machine CA will be described referring to the flow chart of FIG. 6.

CPU 41a for example, starts processing upon turn-on of a power source, and makes initialization such as memory clear, standard mode setting or the like (S41). Subsequently, processes in steps S43-S55 are executed.

Step S43 is an accepting process for received data from a group of key switches on operation panel 40 (a group of ten keys 47a for numerical input, a print key (PR) key 46a for copy start command, a clear key 48a for set number clear command, etc.), a group of switches such as a trouble reset switch 49a, and a group of sensors SE provided in copying machine CA, and received data from data terminal A side, and also it is a process for transmitting count data and so forth to the data terminal A.

Step S47 is a step collectively indicating processes necessary in copying operation, which includes, for example, paper feed control, scanning control, photoreceptor drum control, developing device control and so forth.

The processes after step S51 are for trouble occurrence. That is, when a JAM or other kinds of trouble occurs (YES in S49), a signal corresponding to the occurring trouble is transmitted to controlling CPU 11a of data terminal A (S51). Upon operation of trouble reset switch 49a by an operator or the like (YES in S53), similarly to the above description, a trouble reset signal is transmitted to controlling CPU 11a of the data terminal A (S55).

Processes on Data Terminal Side

Next, processes by controlling CPU 11a of the data terminal A are described referring to flow charts shown in FIGS. 7-14.

(a) Main Routine

Figure 7:
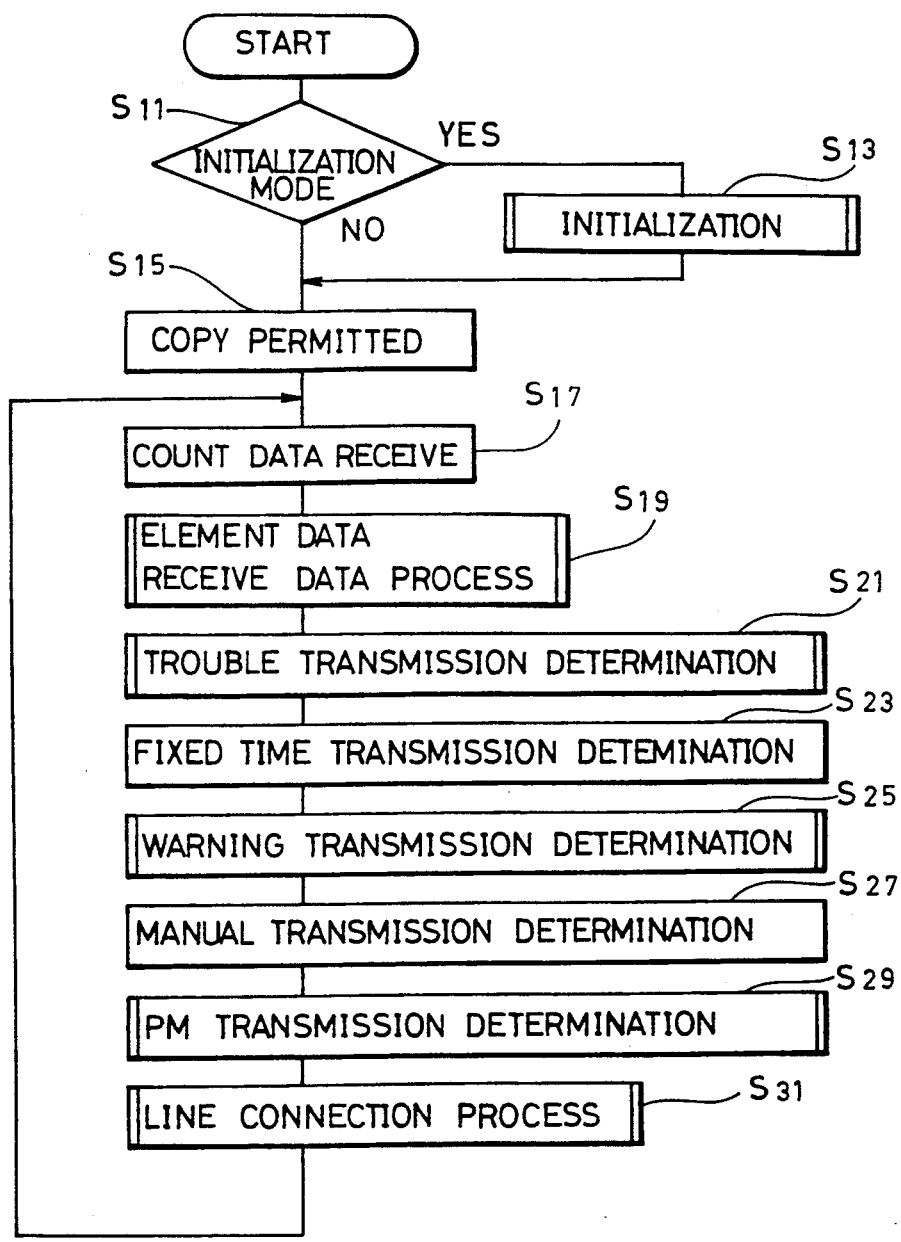
FIG. 7 is a flow chart showing a main routine of a controlling CPU of the data terminal of FIG. 2A.

First, the outline of the processes will be described on the basis of the main routine of FIG. 7.

The controlling CPU 11a starts processing upon turn-on of a power source, carries out an initialization process as required (S13), and then transmits a copy permitting signal to controlling CPU 41a of a copying machine CA (S15). Subsequently, it proceeds to the repeated loop process of steps S17-S31.

Generally, the following processes are carried out in respective subroutine steps.

* Initialization: S13

Upon turn-on of the power source, when dip switch DIP.SW5 is ON, that is, when it is an initialization mode (YES in S11), this routine is executed. Specifically, as will be described later, a selection number (telephone number) of modem 72a of a center A device, an ID number of data terminal A (DTID), an ID number of the center (center ID) and a selection number (telephone number of center B device are set and initialization transmission is made.

* Count Data receipt: S17

A receiving process of various kinds of count data transmitted from controlling CPU 41a of copying machine CA is carried out.

The data contents include a discharge code, JAM and trouble codes, data of JAM and trouble counters, a counter for each paper size and a PM counter.

The controlling CPU 11a of a DT updates such data to the newest values and holds the same.

* Element Data Receipt and Data Processings: S19

As will be described later, CPU 11 sequentially operates data corresponding to an average value of each element data and a standard deviation to update them to the newest values.

* Trouble Transmission Determination: S21

As will be described later, a determination is made as to whether or not the trouble data and trouble recovery data should be transmitted to the center, for example.

* Fixed Time Transmission Determination: S23

A fixed time transmission flag is set to 1 at a predetermined fixed time transmission time and various kinds of count data and various kinds of element data are transmitted to the center.

After completion of transmission by the fixed time transmission, fixed time transmission time data for the next time, current time data and data of the closing date of a bill are transmitted in turn from the center side.

* Warning Transmission Determination: S25

As will be described later, element data, a counted value of a JAM counter, and a counted value of a PM counter are compared with predetermined threshold values, respectively.

On the basis of the results thereof, a determination is made as to whether or not warning data, warning recovery data should be transmitted to the center.

* Manual Transmission Determination: S27

When it is not in the initialization mode, when push switch 21a is turned on, a manual transmission flag is set to 1.

By this, various count data, various element data are transmitted to the center.

* PM Transmission Determination: S29

As will be described later, a count value before clearing the PM counter in which a count value is cleared to "0" by parts replacement is transmitted to the center.

* Line Connection Process: S31

As will be described later, when any of transmission flags is set to "1" and transmission is permitted by transmission controller 6, the communication terminal device on the center side is called. After connection is made with CPU 91a or CPU 91b on the center side, data communication is executed.

(b) Subroutine

Next, details of respective subroutine steps will be sequentially described referring to FIGS. 8-14.

Figure 8A:
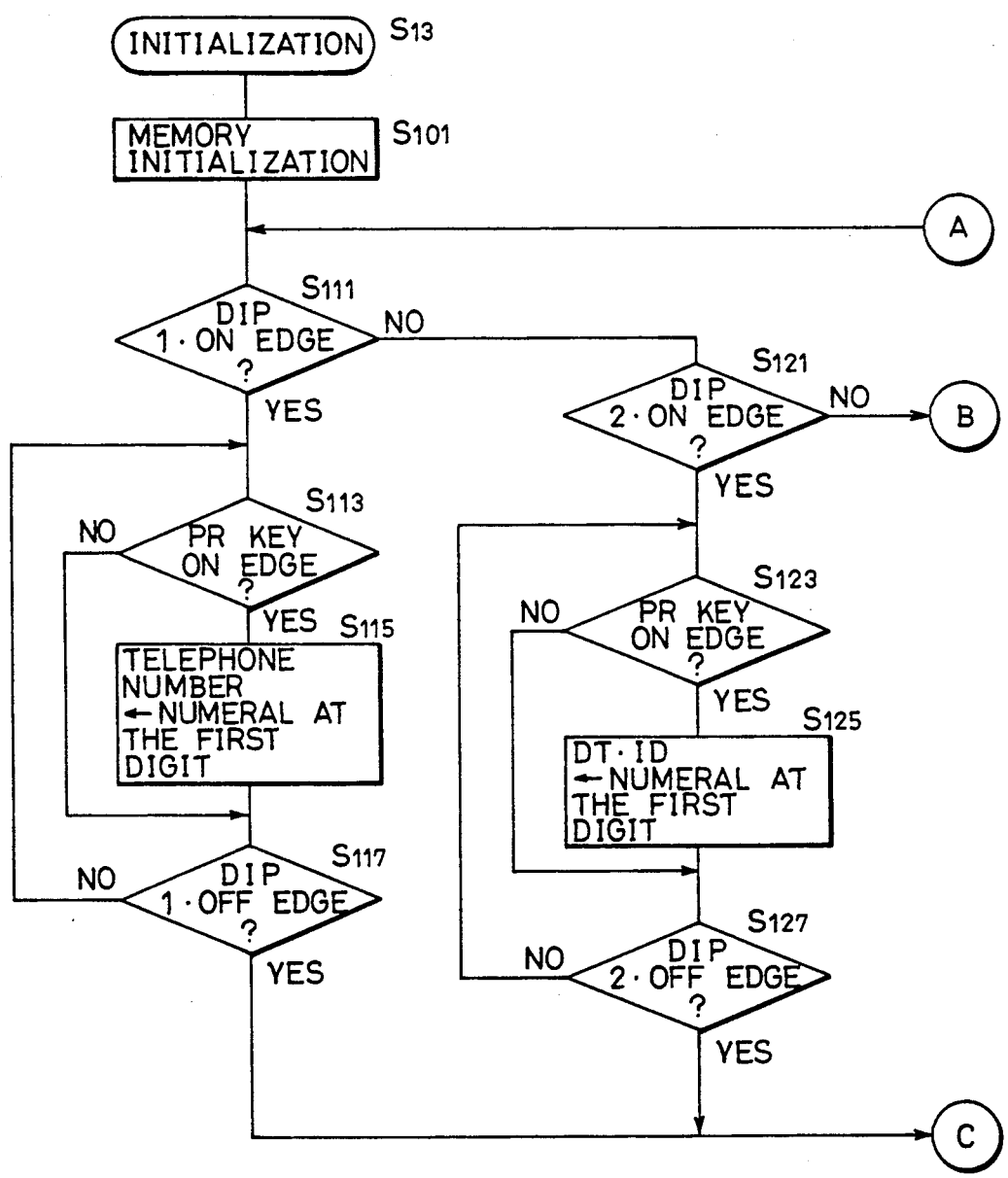
FIGS. 8A and 8B are flow charts showing specific contents of an initialization routine of FIG. 7.
Figure 8B:
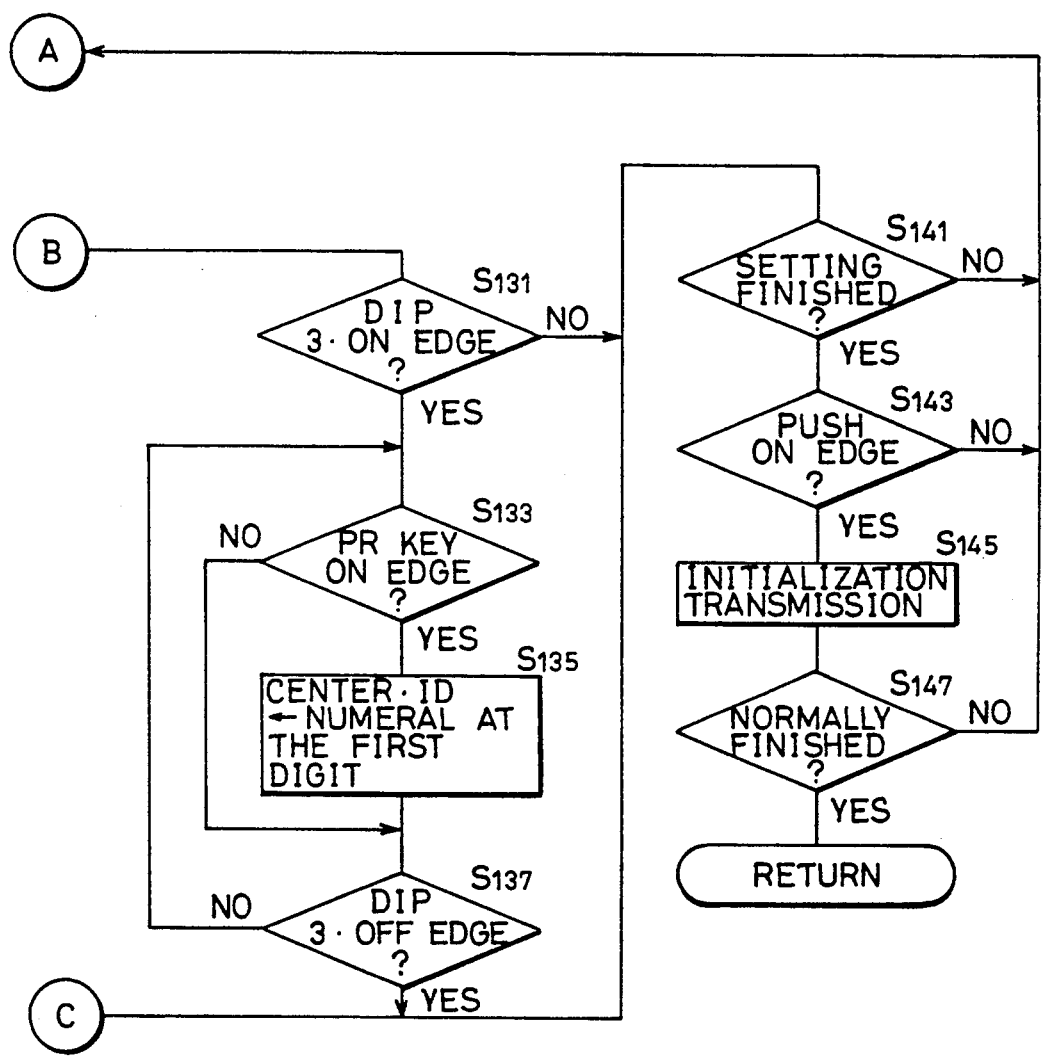

Initialization Process (FIGS. 8A and 8B)

This process is a process carried out when dip switch DIP.SW5 is on in turn-on of the power source (YES in S11), wherein initialization of a selection number of the center A device, an ID number of a data terminal (DTID) a common ID number of the center A and B devices (center ID) and a selection number of the center B device are accepted, and then initialization transmission is carried out.

First, S-RAM 15a is initialized (S101), and ON of four dip switches DIP.SW1-DIP.SW4 are waited for.

When DIP.SW1 is turned on (YES in S111), an input mode of the selection number (telephone number) of modem 72a of the center A device is implemented. That is, a figure inputted with ten key 47 of the copying machine and displayed at the first digit of display portion 45a is stored in a nonvolatile memory 16a as selection number data of the modem 72a in response to input of print key 46 (YES in S113). The selection number input mode of modem 72a is released with OFF of DIP.SW1 (S117).

Similarly, in response to ON of DIP.SW2 (YES in S121), an input mode of DTID is set, and a figure displayed at the first digit of display portion 45a is stored in nonvolatile memory 16a (S125) as DTID data in response to input of print key 46a (YES in S123). The DTID input mode is released with OFF of DIP.SW2 (S127).

Similarly, in response to ON of DIP.SW3 (YES in S131), an input mode of the center ID (a common ID of the center A device and the center B device) is set and a figure displayed at the first digit of display portion 45a is stored in nonvolatile memory 16a as the common center ID data (S135) for every input of print key 46a (YES in S133). The center ID input mode is released with OFF of DIP.SW3 (S137).

Similarly, when DIP.SW4 is turned on (YES in S141), an input mode of a selection number (telephone number) of modem 72b of the center B device is implemented. That is, a figure inputted by ten key 47a of a copying machine and being displayed at the first digit of display 45a is stored in non-volatile memory 16a as selection number data of modem 72b corresponding to input of print key 46a (YES in S143) (S145). The selection number input mode of modem 72b is canceled upon OFF of DIP.SW4 (S147).

In this way, when four kinds of data setting have been finished all (YES in S151), push switch 21 is made valid, and upon ON of the push switch 21a (YES in S153), initialization transmission is made to the center A device (S155).

That is, the above two kinds of ID data are transmitted to CPU 91a of the center A device after line is connected to the center A device side. When the transmission is finished, the data transmitted from CPU 91a of the center A device (the closing date of the count data, the next fixed time transmission time, the current time, and a threshold value of a warning determination) are received.

When the above transmission and receipt are finished, a determination is made as to whether the communication has been normally made or not (S157).

As a result, when the communication has not been normally made (NO in S157), it returns to step S111 and another ON of DIP.SW1 is stood by.

On the other hand, when the communication has been made normally (YES in S157), it returns to the main routine and the processes after step S15 are carried out.

Figure 9A:
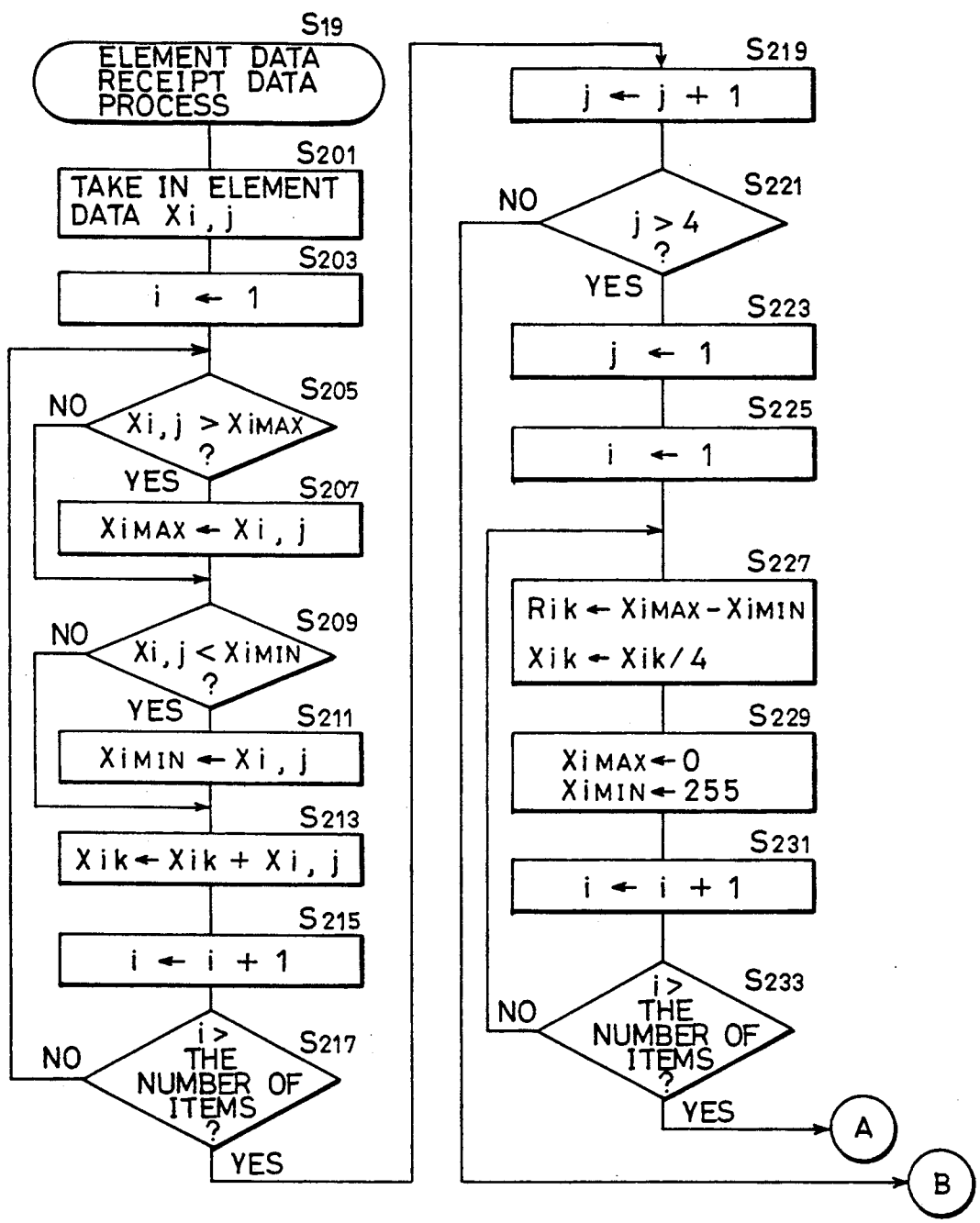
FIGS. 9A and 9B are flow charts showing specific contents of the element data receiving data processing routine of FIG. 7.
Figure 9B:
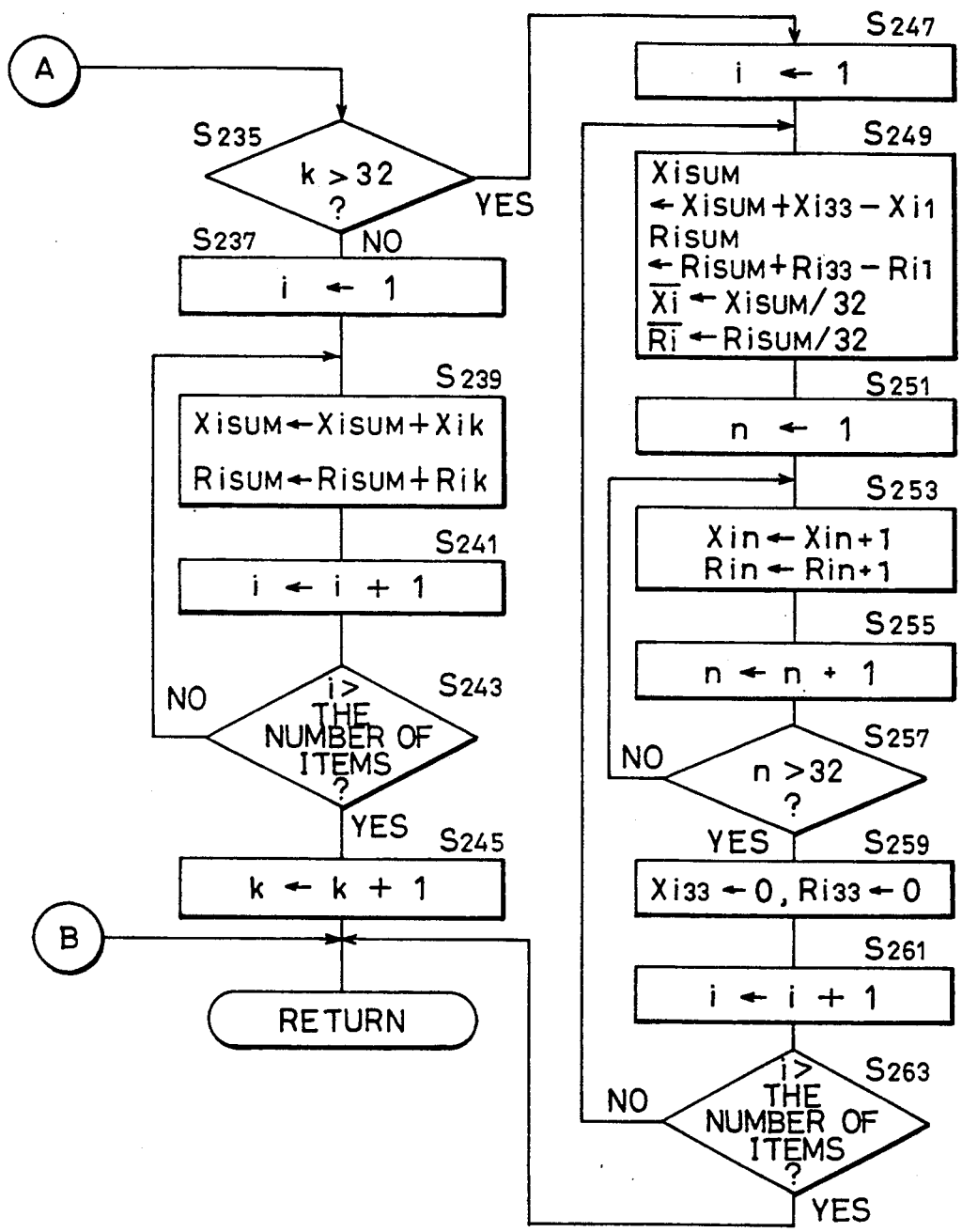

*Element Data Receipt etc. (FIGS. 9A and 9B)

In this subroutine step, data for comparison with a threshold value (refer to the warning transmission determination routine of FIGS. 11A and 11B) is operated on the basis of the element data transmitted from a copying machine.

First, a group of element data $X_{i,j}$ transmitted from a copying machine for every discharge of copy paper are taken in from serial I/F13a (S201). Here, the subscript i expresses an item umber of the element data nd the subscript j expresses the order in each item.

Next, after substituting an initial value 1 for the item number i (S203), the maximum value $X_{iMAX}$, the minimum value $X_{iMIN}$ and a sum $X_{ik}$ are sequentially updated for each item (S205–S217).

Subsequently, the subscript j is incremented (S219), and when j is 4 or smaller, the flow returns to the main routine.

In this way, when the processes of steps S201–S217 are carried out four times for each item (S221; YES), the subscript j is reset to 1 (S223), an initial value 1 is substituted into the item umber i (S225), and the difference $R_{ik}$ between the maximum value and the minimum value and an average value $X_{ik}$ of four pieces of data are respectively calculated for each item (S227–S233). In step S229, initial values of the maximum value $X_{iMAX}$ and the minimum value $X_{iMIN}$ are given for preparation of processes in the next steps S205–S211.

After the processes of the above S227–S233, the processes of steps S237–S245, or of steps S247–S263 are carried out.

Steps S237–S245 are processes for a case in which the total of the processes of above S227–S233 does not reach thirty three times, wherein a sum $R_{iSUM}$ of the difference $R_{ik}$ between the above-mentioned maximum value and the minimum value and a sum $X_{iSUM}$ of the average value $X_{ik}$ of the above-mentioned four pieces of data are calculated for the data for thirty two times for each item.

Steps S247–S263 are processes for the case in which the total of processes in the above S227–S233 is thirty three times or more, wherein a sum $R_{iSUM}$ of the above difference $R_{ik}$ and a sum $X_{iSUM}$ of the above average value $X_{ik}$ are calculated for the newest data for thirty two times for each item, and also calculating average values $X_i$ and $R_i$, respectively.

As described above, an average value $X_i$ of the newest 128 (=4×32) pieces of data and an average value of deviations (a value corresponding to the standard deviation) $R_i$ are obtained for each item of the element data.

Figure 10:
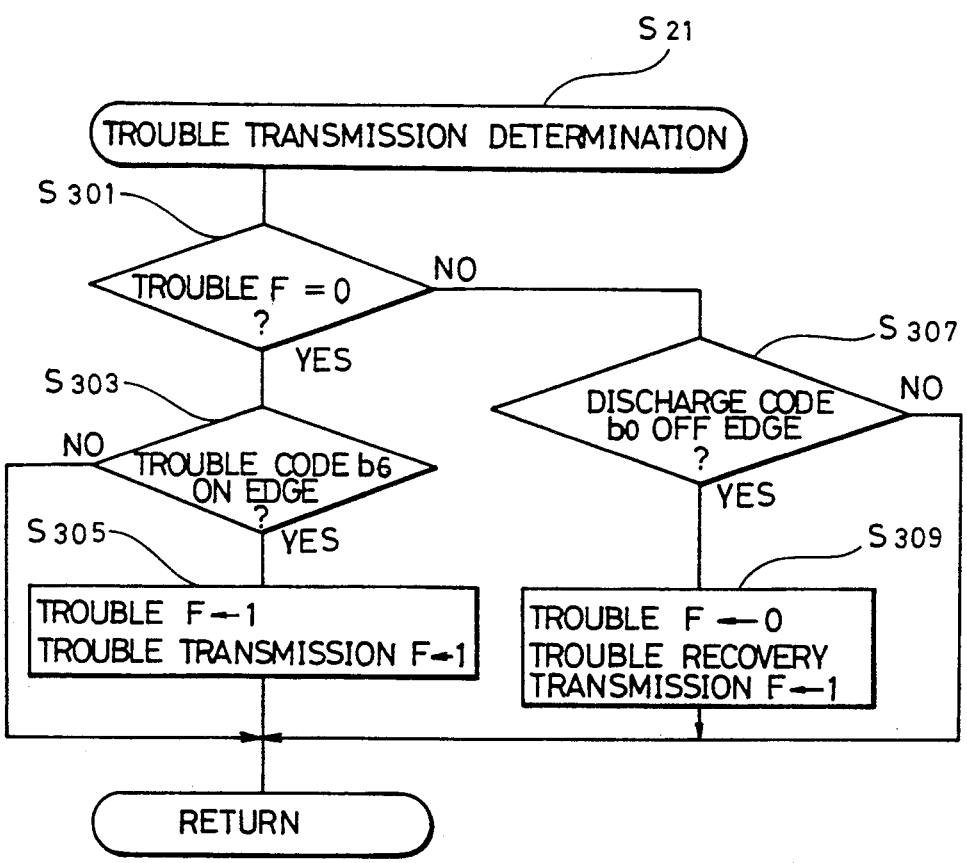
FIG. 10 is a flow chart showing specific contents of the trouble transmission determination routine of FIG. 7.

*Trouble Transmission Determination (FIG. 10)

The process is a subroutine for controlling trouble transmission and trouble recovery transmission.

That is, when "trouble flag=0" (YES in S301), if a trouble code is detected from a copying machine (YES in S303), the trouble flag and a trouble transmission flag are set to "1", respectively (S305).

In a condition of "trouble flag=1" (NO in S301), when a paper discharge code from a copying machine is detected (YES in S307), the trouble flag is reset to "0" and a trouble recovery transmission flag is set to "1" (S309). This is because the paper discharge in a copying machine is an operation to be performed after a trouble is recovered.

Upon setting of the trouble transmission flag and the trouble recovery transmission flag, a line communication process (FIGS. 13A and 13C) is carried out and trouble data or trouble recovery data are transmitted to the center B device, respectively.

Figure 11A:
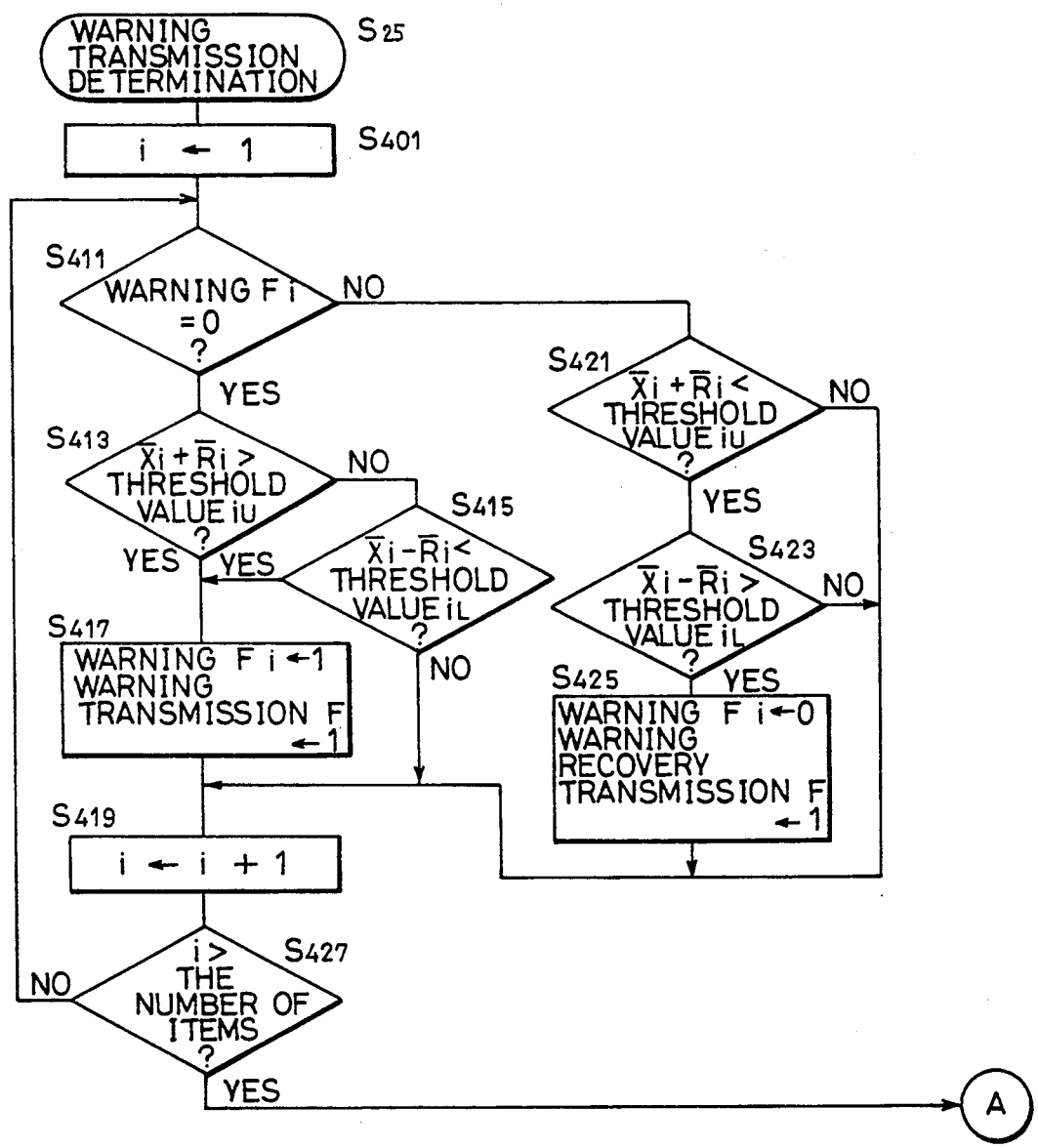
FIGS. 11A and 11B are flow charts showing specific contents of the warning transmission determination routine of FIG. 7.
Figure 11:
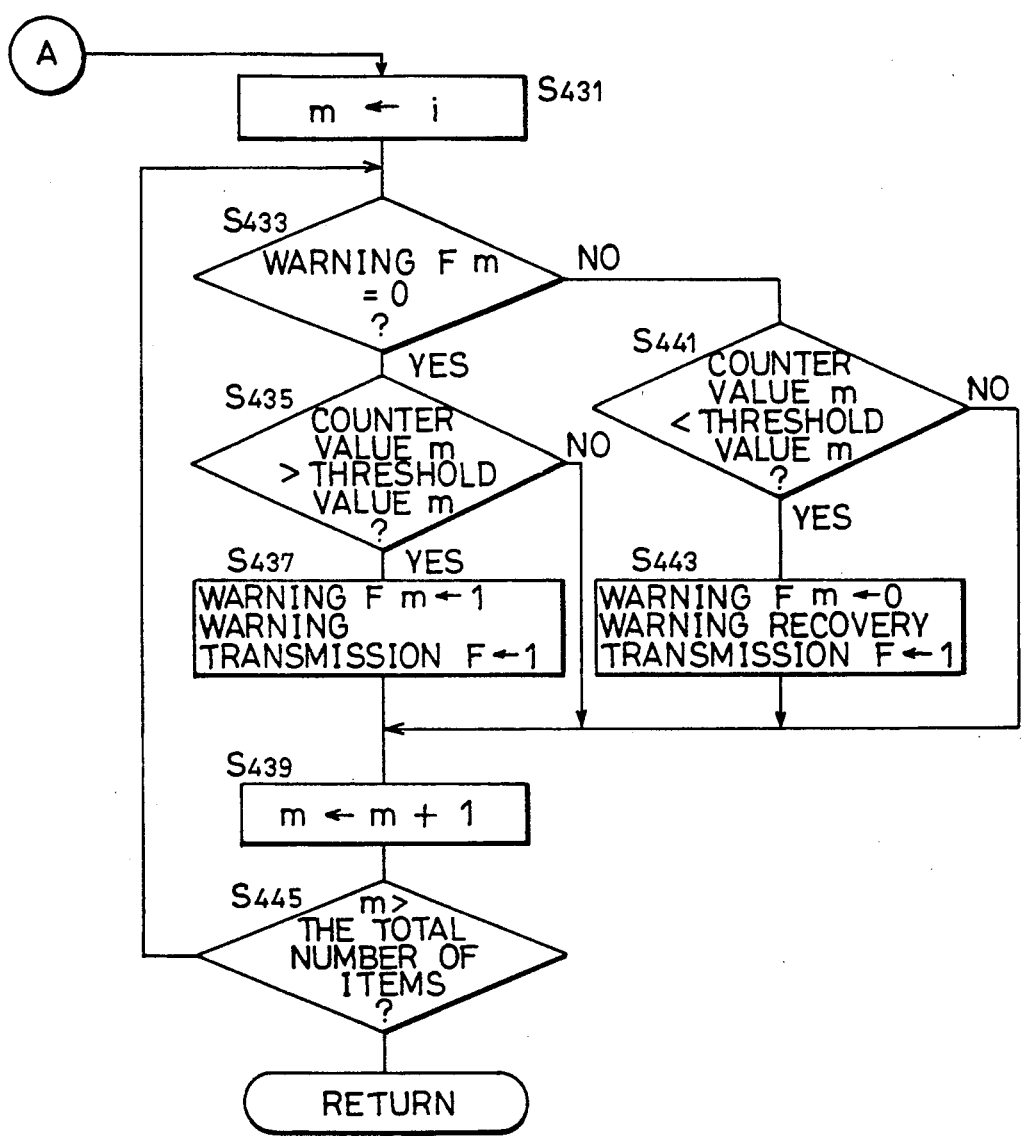

*Warning Transmission Determination (FIGS. 11A and 11B)

In this routine, the warning transmission and warning recovery transmission are controlled.

Steps S401 through S427 are processes for making warning transmission when a value of element data gets out of a peculiar permittable range, and warning recovery transmission when it recovers into the permittable range, respectively.

First, an initial value "1" is set in the item number i indicating a type of the element data (S401).

Next, in step S411, a warning flag about object element data (in the first time, the first element data) is examined.

As the result, when the warning flag about the particular element data is "0" (YES in S411), a determination is made as to whether or not the element data value is in the permittable range peculiar to the element data, in other words, whether or not it is in the range not more than an upper limit threshold value $_{iU}$ and not less than a lower limit threshold value $_{iL}$. When it is out of the permittable range (YES in S413 or YES in S415), a warning flag $F_i$ about the particular element data and a warning transmission flag are set to "1", respectively (S417). By this, the line communication process (FIGS. 13A and 13C) is carried out and warning data is transmitted to the center A device.

On the other hand, when a warning flag of the objective element data is "1" (NO in S411), a determination is made as to whether the value of the element data has recovered into the above-mentioned permittable range onto. If it has recovered (YES in S421 and YES in S423), a warning flag $F_i$ about the particular element data is reset to "0", and the warning recovery transmission flag is set to "1". By this, the line communication process (FIGS. 13A and 13C) is carried out, and warning recovery data is transmitted to the center A device.

After performing such processes until i attains the number of items of the element data, in other words, after performing processes with respect to all the element data, the flow proceeds to the processes after step S431.

Steps S431–S445 are processes for making warning transmission when count values (frequency) of the JAM counter and the PM counter exceed peculiar threshold values, and warning recovery transmission when they recover below the threshold values, respectively.

First, an initial value "i (the last number of the element data $+1$)" is set in the item number m indicating types of a JAM counter and a PM counter (S431).

Next, in step S433, a warning flag bout the objective JAM counter or PM counter is examined.

As a result, when the warning flag about the particular JAM counter or PM counter is "0" (YES in S433), a determination is made as to whether or not the value of the counter is in a permittable range peculiar to the counter, or whether it exceeds the threshold value $_m$ or not. When it exceeds the value (YES in S435), the warning flag $F_m$ and the warning transmission flag about the particular counter are set to "1", respectively (S437). By this, the line communication process (FIGS. 13A and 13C) is carried out and warning data is transmitted to the center A device.

On the other hand, when a warning flag about the objective JAM counter or PM counter is "1" in the abovementioned S433 (NO in S433), a determination is made as to whether the value of the particular counter has been recovered below the above threshold value or not. In the case of recovery (YES in S441), the warning flag $F_m$ about the particular counter is reset to "0", and the warning recovery transmission flag is set to "1". By this, the line communication process (FIGS. 13A and 13C) is carried out and the warning recovery data are transmitted to the center A device.

After performing such processes until m attains the total number of items of element data and counters, in other words, after performing with respect to all the counters, it returns to the main routine.

As described above, the warning transmission and the warning recovery transmission are controlled.

Figure 12:
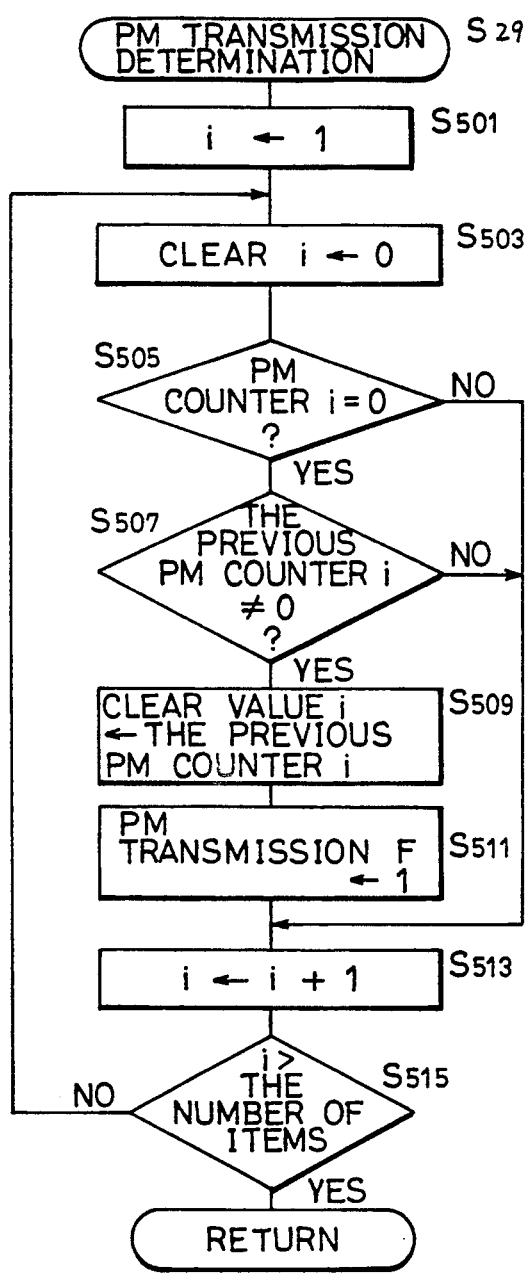
FIG. 12 is a flow chart showing specific contents of the PM transmission determination routine of FIG. 7.
Figure 13A:
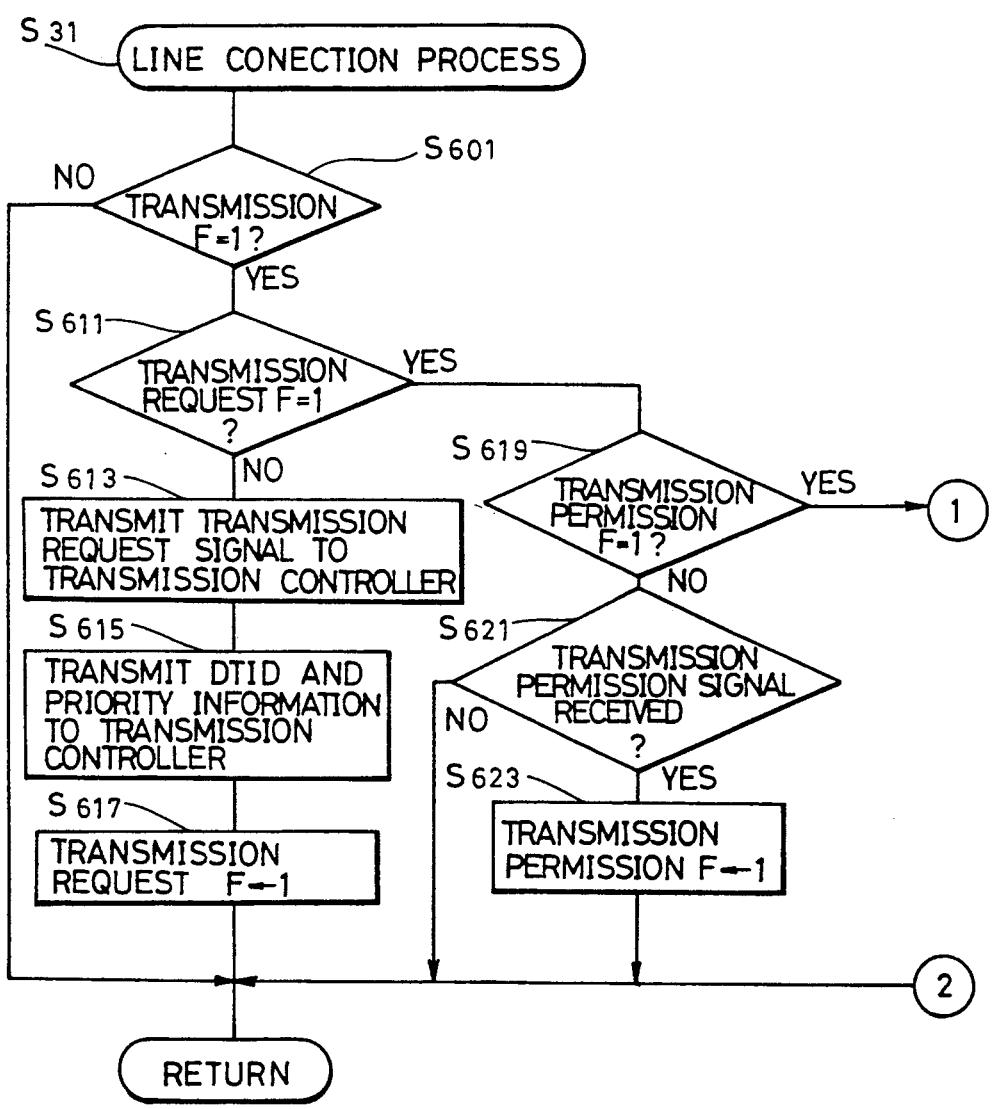
FIGS. 13A-13C are flow charts showing specific contents of the line connecting process routine of FIG. 7.
Figure 13B:
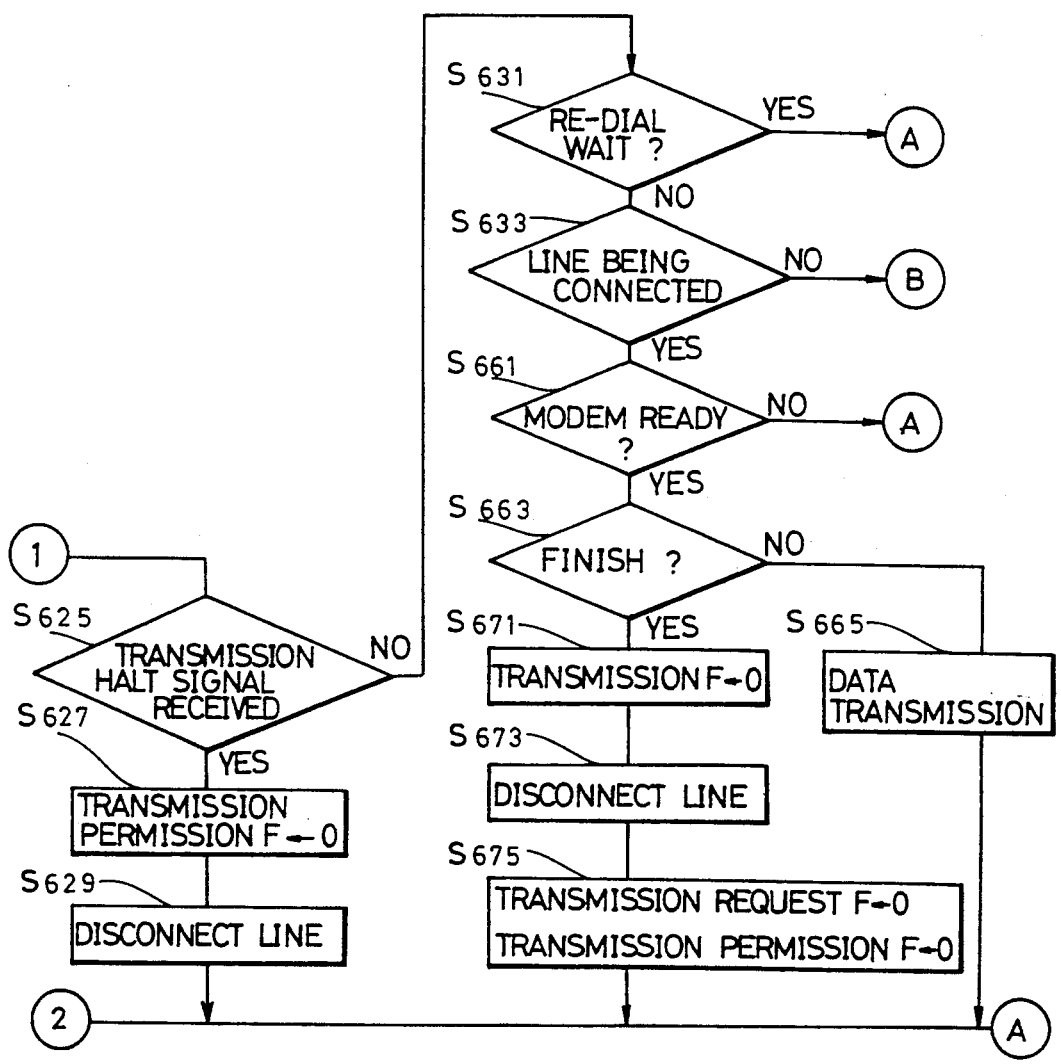
Figure 13C:
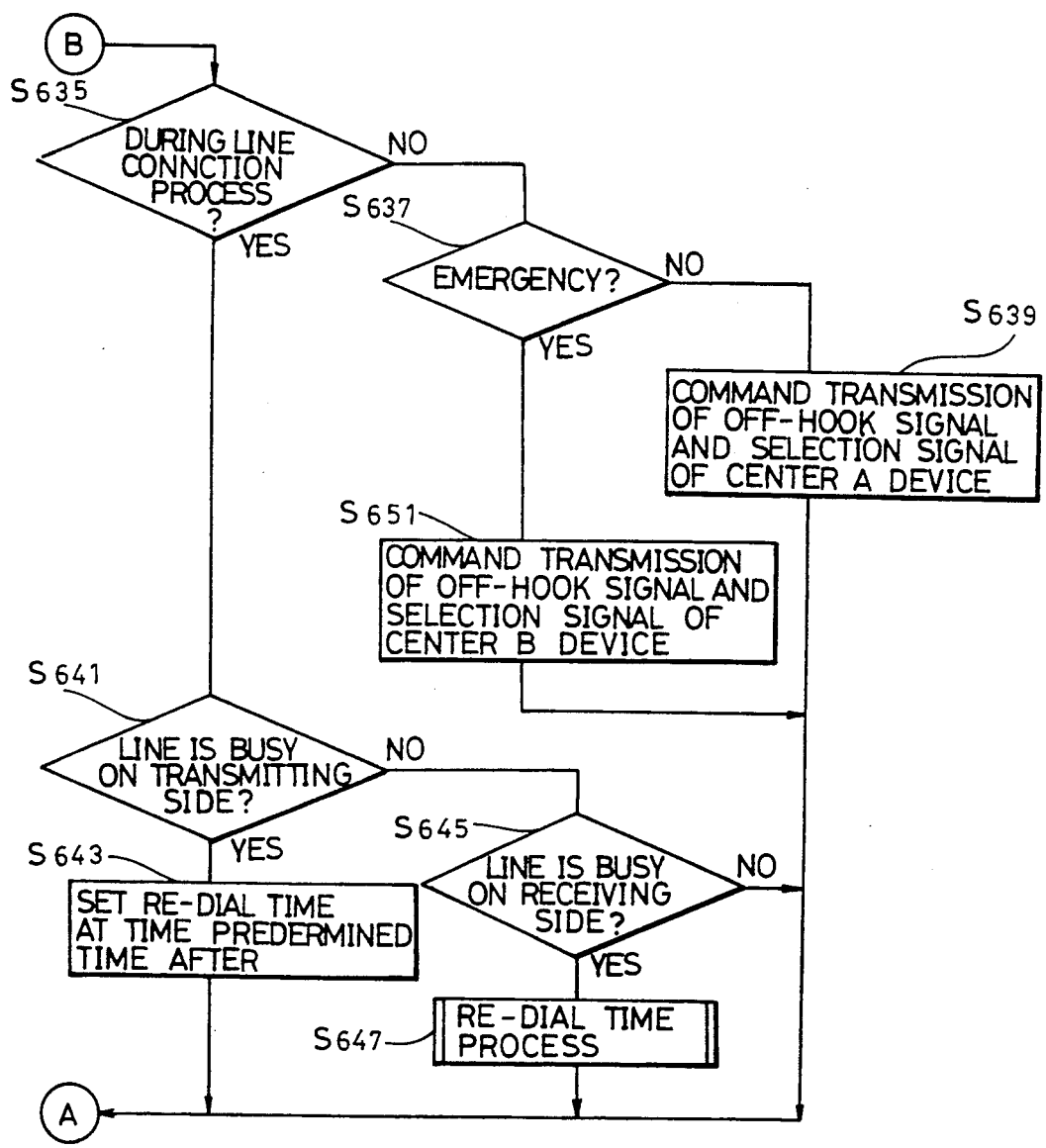
Figure 15:
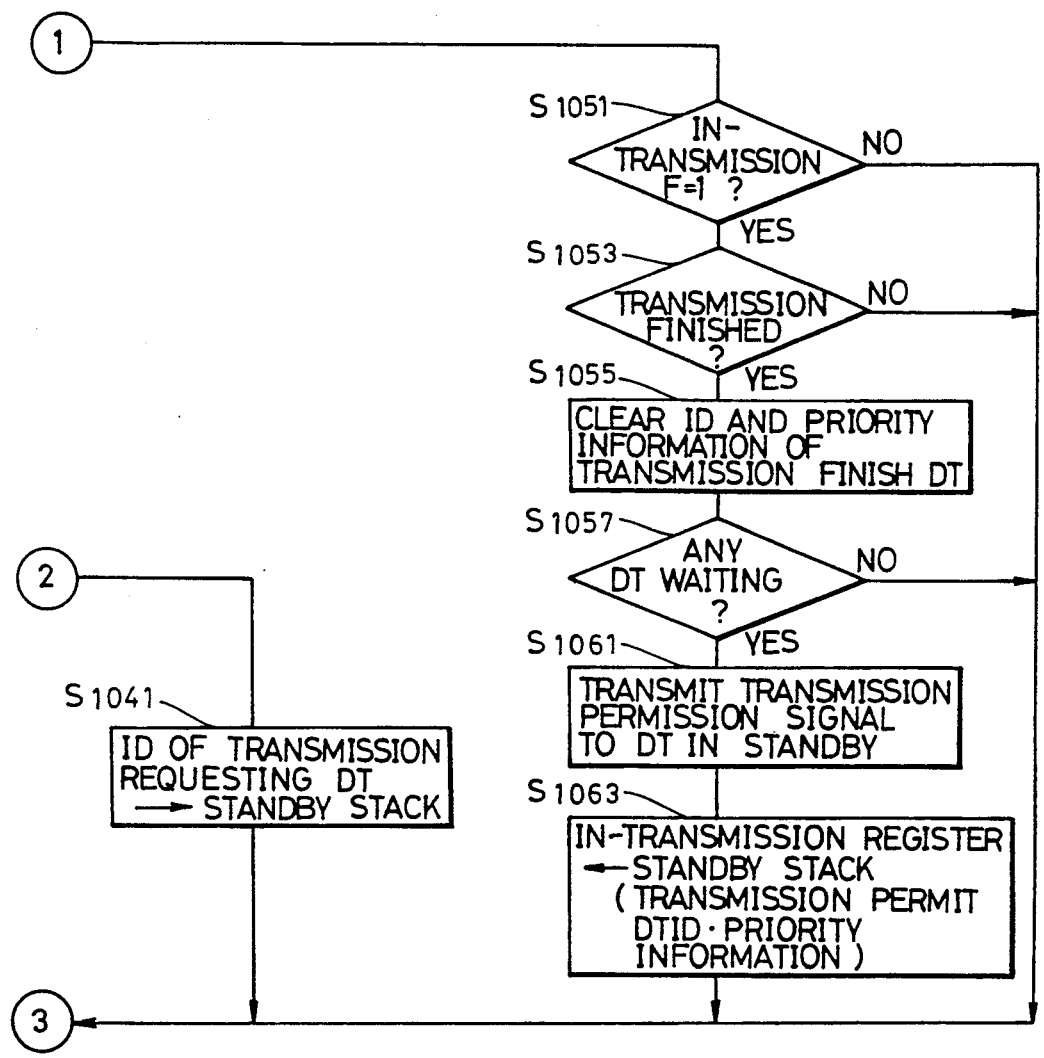
FIGS. 15A and 15B are flow charts showing processes by a controlling CPU 61 of the transmission controller of FIG. 2A.

* PM Transmission Determination (FIG. 12)

In this routine, the PM transmission is controlled.

First, an item number i indicating a type of a PM counter is set to an initial value "1" (S501), and after the processes in steps S503–S511 are carried out, the value of i is incremented, that is, changing a type of PM counter, the above processes are repeated.

Here, the processes in the above S503–S511 are processes for retaining a count value immediately before clearing the PM counter (S509) and setting the PM transmission flag to "1" (S511) when the PM counter is cleared (YES in S505 and YES in S507). A PM counter is cleared by a serviceman when replacing parts corresponding to the PM counter.

When "PM transmission flag $=1$", the line communication process (FIG. 13) is carried out, and the PM data (types of replaced parts, a count value immediately before the replacement) are transmitted to the center A device.

*Line Connection Process (FIGS. 13A–13C and 14)

In this process, a transmission request is caused for transmission controller 6 in response to "any transmission flag $=1$". When transmission is permitted by transmission controller 6, the control center is called and data corresponding to that transmission flag is transmitted.

First, when ay transmission flag is set to "1" (YES in S601), on condition that a transmission request is not caused to transmission controller 6 (NO in S611), a transmission requesting signal is transmitted to transmission controller 6 (S613), and the DTID and the priority information (for example, type of the above transmission flag $=$ type of satisfied predetermined transmission condition) is transmitted to transmission controller 6 (S615). Subsequently, in order to indicate that a transmission request is caused, the transmission requesting flag is set to "1" and the flow returns to the main routine.

When a transmission request is caused in this way, a standby mode for receiving a transmission permitting signal transmitted from transmission controller 6 is implemented, and when the transmission permitting signal is received (YES in S621), the transmission permission flag is set to "1" (S623). The determination in the next step S619 is thus "YES", and processings after step S631 are performed.

That is, on condition that it is not in a redial standby (NO in S631), the communication line is not connected with the center side modems 72a, 72b (NO in S633), and that an off-hook signal and a selection signal of the center A device or the center B device are not transmitted to the communication line (NO in S635), transmission of an off-hook signal and a selection number signal of the center A device or the center B device to the communication line is commanded to modem 52 (S639, S651). A call to the center A device is made in normal transmission, and a call to the center B device is made when a trouble occurs.

By the process in step S639 or step S651, the determination in the next step S635 is "YES". In this case, when telephone machine 53 on the user is "(the line is) busy" and modem 52 can not transmit an off-hook signal and a selection signal to the communication line (YES in S641), a time predetermined time after is set as a redialing time (S643). By the process in the S643, the determination in step S631 stays "YES" until the above redialing time, and the calling processes of the center side modems 72a, 72b are not executed. At the re-dialing time, with NO in S631→NO in S633→NO in S635→S637→S639 or S651, transmission of an off-hook signal and a selection signal of the center A device or the center B device to the communication line is commanded to modem 52 again.

As a result of transmission of an off-signal and a selection number signal of the center A device or the center B device to the communication line from modem 52 by the process in step S639 or step S651, when a determination is made that center side modem 72a or 72b is "(the line is) busy (the communication line is occupied on the center side)" (YES in S645), the re-dialing time process (FIG. 14, described later) is executed (S647). Thus, a determination in step S631 stays "YES" until time set in the re-dialing time process, a call of center side modem 72a or 72b is made (S639 or S651).

On the other hand, when an off-hook signal and a selection signal of the center A device or the center B device are transmitted from modem 52 to the communication line by the process in step S639 or step S651, and as a result, the communication line is connected to center side modem 72a or 72b (YES in S633), a transmittable state by data transmission permission from center side CPU 91a or 91b is waited for. Then, when it comes in a transmittable state (YES in S661), data is transmitted to the center side (S665). The data transmitted in the step S665 is data defined with a transmission flag set to "1".

Thus, when all the data are transmitted (YES in S663), the transmission flag is reset to "0" (S671), and transmission of a lien disconnecting signal to the communication line is commanded to disconnect the communication line to the center (S673). Subsequently, the transmission request flag and the transmission permission flag are reset to "0" (S675).

When a transmission halt signal transmitted from transmission controller 6 is received in the course of any ob the above processes (YES in S625), the transmission permission flag is reset to "0" (S627), and transmission of a line disconnecting signal to the communication line is commanded to disconnect the communication line to the center side (S629). The cases where a transmission halt signal is received include a case where a transmission request with high priority is caused from another data terminal as will be described later.

Next, the re-dialing time process (FIG. 13, S647) will be described.

The re-dialing time process is a process for setting retransmission (re-dial=re-call) time when connection can not be made to CPU 91a or CPU 91b on the center side (YES in S645).

First, a counter for counting the number of times of redialing (a redial counter) is counted up (S681). The counter is cleared after connection is made with the center.

Next, a determination is made as to whether the present dialing is a dialing in an emergency mode (in the case of trouble transmission) or not, and if it is the emergency mode (YES in S683), on the condition that a redial counter value is less than "a" (=about 10-20 times) (YES in S685), the time one minute after the present time is set as the next redialing time (S687). That is, in the case of the emergency mode, the center is called for every minute until the number of times of redialing reaches "a" times.

When the number of times of redialing in the emergency mode reaches "a" (NO in S685), a predetermined time in the next day is set as a redialing time (S689). The redialing time is set in the next day in order to avoid occupying a telephone of a user when connection to the center can not e made in spite of dialing for "a" times (abnormally busy network condition, operation stop of the center side CPU 91b and so forth are possible).

On the other hand, when it is determined that it is not in the emergency mode in the S683 (NO in S683), on the condition that the redial counter value is less than b (YES in S691), an arbitrary even minute time within twenty minutes from the present time is set as the next redialing time on the basis of a random number (S693). This is done in order to increase the possibility of connecting to the center by dispersing redialing times of respective DTs when dialings to the center from a large number of DTs are made.

When the number of times of redialing in the non-emergency mode exceeds b (NO in S691), a predetermined time in the next day is set as a redialing time for the next time (S695). This is in order to avoid occupying a telephone 53 of a user when making connection to the center is impossible in spite of dialing for "b" times (abnormally busy network, operational stop of the center side CPU 91a and so forth are possible).

As described above, the line connection process is performed and data is transmitted to the center and also data from the center is received as needed.

Processes in Transmission Controller

Figure 16:
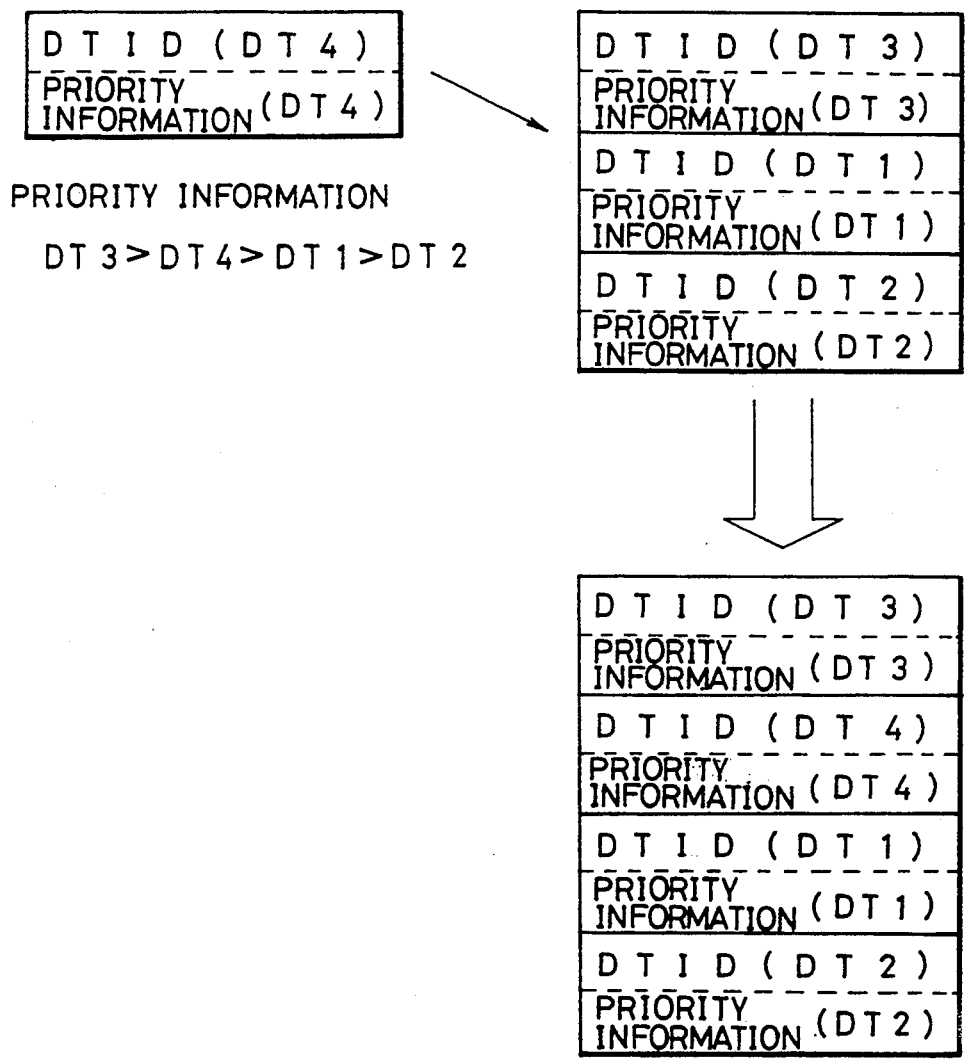
FIG. 16 is a diagram for describing data storage in a standby stack by the transmission controller of FIG. 2A.
Figure 15A:
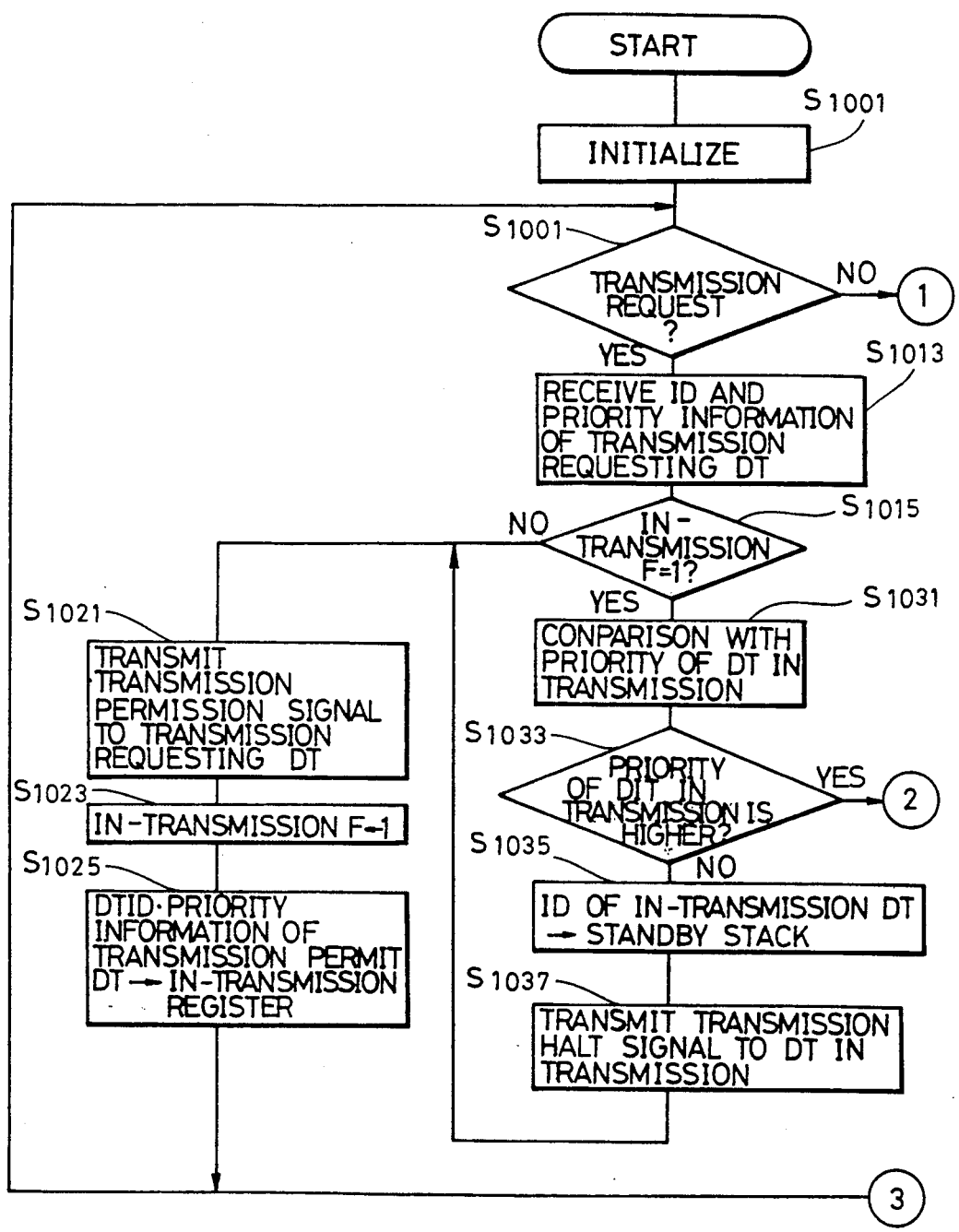

Next, referring to FIGS. 15A, 15B and 16, processings in transmission controller 6 are described. In the transmission controller 6, it is controlled which data terminal is to be connected to the control center when transmissions from data terminal A-N overlap.

Controlling CPU 61 of transmission controller 6 starts processings upon turn-on of the power supply, for example, and performs initialization process such as clear of an in-transmission register (S1001). Then, a standby state of a transmission request signal transmitted from controlling CPUs 11a-11n of data terminals A-N is implemented (S1011).

In a state where no transmission is made from any data terminals (a state in which "in-transmitting flag=0"), if a transmission request signal is received from a controlling CPU 11y (y=any of a-n) of an arbitrary data terminal Y (Y=any of A-N) (YES in S1011), a DTID and priority information of that data terminal Y are received (S1013). Also, since "in-transmission flag≠1" (NO in (S1015), the flow proceeds to step S1021 to transmit a transmission permitting signal to that data terminal Y (S1021). Furthermore, in-transmission flag is set to "1" (S1023), and the DTID and the priority information of the data terminal Y are stored in the in-transmission register (S1025).

Next, when a transmission request signal is received from a controlling CPU 11z (z=any of a-n, z≠y) of an arbitrary data terminal Z (Z=any of A-N, Z≠Y) during transmission of the data terminal Y (a state of "in transmission flag=1) (YES in S1011), a DTID and priority information of that data terminal Z are received (S1013). Also, since "in-transmission flag=1" (YES in S1015, refer to S1023), the flow proceeds to step S1031, where the priority of the data terminal currently in transmission and the priority of the data terminal Z which makes transmission request this time are compared (S1031), and according to the result (S1033), the processings of S1035→S1037→S1021→S1025, or S1041 are performed.

That is, when the priority of the data terminal Y now in transmission is higher than the priority of the data terminal Z which caused transmission request this time (YES in S1033), the DTID and the priority information of the data terminal Z with lower priority is stored in a standby stack (S1041). Thus, after completion of communication by the data terminal Y being in transmission, transmission from the data terminal Z is made (refer to S1061). The storage into the standby stack is performed so that a data terminal with higher priority is always on the higher order and it is read out from the highest order stack as shown in FIG. 16.

When a determination is made that the priority of the data terminal Z which caused transmission request this time is higher than the priority of the data terminal Y now in transmission (NO in S1033), the DTID of the data terminal Y with lower priority is stored in the standby stack (S1035). This is for re-starting transmission from the data terminal Y after communication with the data terminal Z is finished (refer to S1061). Then, a transmission halt signal is transmitted to the data terminal Y (S1037), and also a transmission permission signal is transmitted to the data terminal Z which caused transmission request with higher priority (S1021). The transmission of the data terminal Y being in transmission is thus temporarily interrupted and transmission of the data terminal Z with higher priority is started. Subsequently, the in-transmission flag is continuously set at "1" (S1023), and the DTID and the priority information of the data terminal Z of which transmission is permitted are stored in the in-transmission register (S1025).

On the other hand, if no transmission request signal is received from any of data terminals in the step S1011 (NO in S1011), the flow proceeds to step S1051 to check an in-transmission flag.

As a result, if "in-transmission flag=1", in other words, when transmission is made from any of the data terminals (YES in S1051), completion of the transmission is waited for. When the transmission is finished (YES in S1053), the DTID and the priority information of that data terminal are cleared from the in-transmission register (S1055). The cases where the transmission is finished include, as described above, a case by interruption (S629 in FIG. 13) and a case by completion of communication S673 in FIG. 13). Subsequently, a determination is made as to whether information is stored in the standby stack or not. When information is stored therein, that is, when a data terminal is in transmission standby (YES in S1057, refer to S1035 and S1041), data at the highest order of the standby stack is read out and a transmission permission signal is transmitted to a data terminal corresponding to the data (=a data terminal with the highest priority) (S1061), and also the read data is stored in the in-transmission register (S1063). Thus, transmission from the data terminal which has been waiting for completion of the transmission is made (refer to FIGS. 13A-13C).

Processes in Center

Next, processings in CPU 91a provided in a computer at the center will be described referring to FIGS. 17-19. The processings in CPU 91b are almost same as those in CPU 91a.

Figure 17:
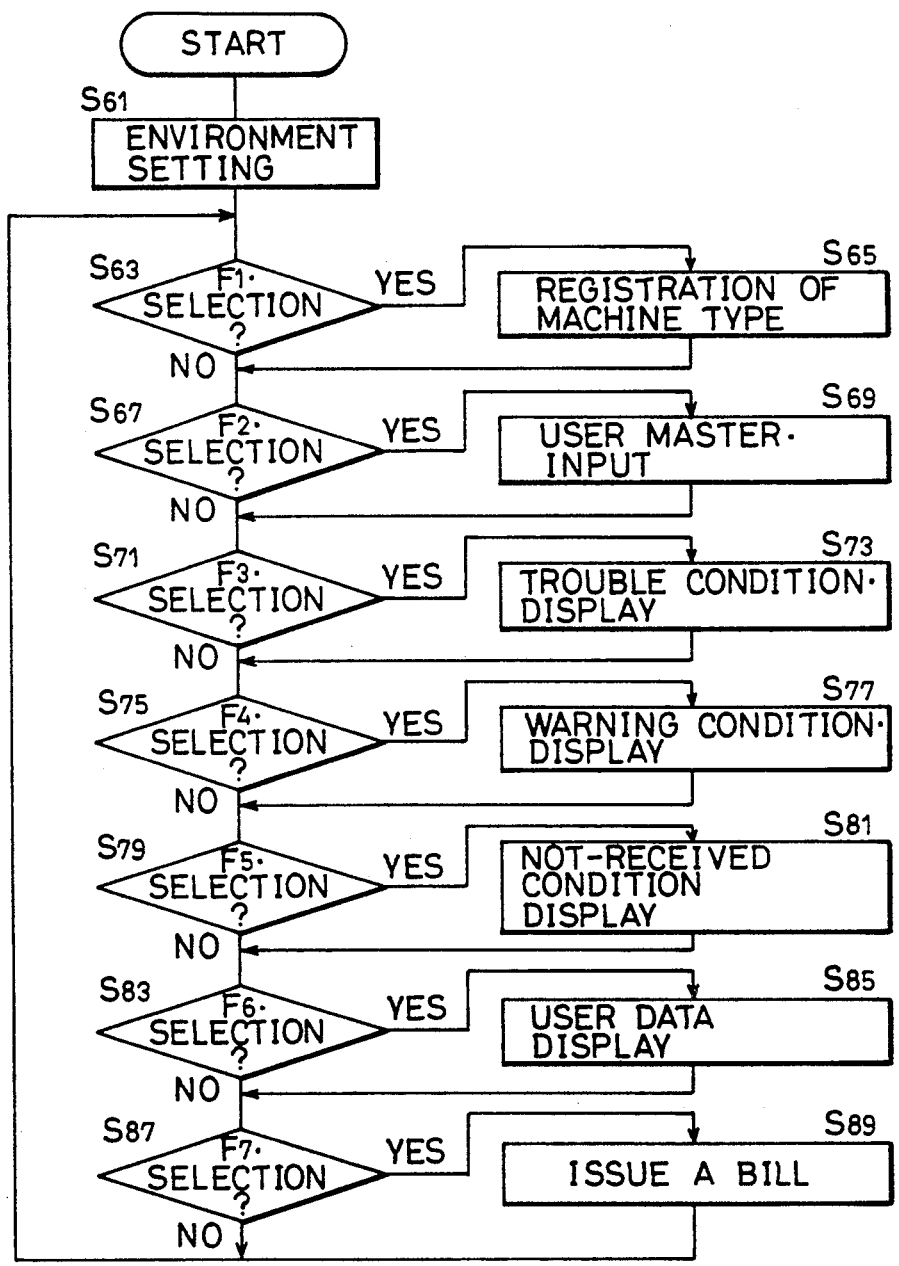
FIG. 17 is a flow chart showing a main routine of a controlling CPU 91a of a computer of the center A device shown in FIG. 2B.

(a) F1-F7 key processes (FIG. 17)

CPU 91 starts processing upon turn-on of a power source, and performs environment setting of a modem, a printer and the like (S61). Subsequently, in response to input operation of each key F1-F7 on keyboard 93a, the following modes are set or the following processes are executed.

F1 key operation (YES in S63)

An acceptance mode of machine type registration is set (S65). That is, new registration of machine type name, the number of items of element data, a name of each element data, a threshold value of each element data, a threshold value of each counter, etc. are accepted.

F2 key operation (YES in S67)

A registration acceptance mode of a user master is set (S69). That is, new registration of a name of user, address, telephone number, date and time of fixed time transmission, etc. are accepted.

F3 key operation (YES in S71)

The trouble conditions are displayed (S73). That is, user information (a name of the user, address, telephone number, a machine type name) of a copying machine of trouble transmission, date and hour of occurrence and so forth are displayed in display 92 together with contents of the trouble. The number of trouble cases is always displayed in a corner portion of display 92a without any connection with operation of F3 key.

F4 key operation (YES in S75)

A warning condition is displayed (S77). That is, user information and so forth of a copying machine of the warning transmission are displayed in display 92a together with the contents of the warning. The number of warning cases is always displayed in a corner portion of display 92a without any connection with operation of the F4 key.

F5 key operation (YES in S79)

A not-received condition is displayed (S81). That is, user information of a copying machine which does not make fixed time transmission even after a predetermined fixed time transmission time is displayed in display 92a. The number of no receipt cases is always displayed in a corner portion of display 92a without any connection with operation of the F4 key.

F6 key operation (YES in S83)

A display mode for user data is implemented (S85). That is, when a user is selected, user information is displayed in display 92a. Also, if a sub menu is selected in a predetermined order, count values of various counters of the copying machine of the particular user (a total counter, a counter for each paper size, a JAM counter, a trouble counter, a PM counter) and element data are displayed for every month or for every item.

F7 key operation (YES in S87)

A bill is printed out (S89). For example, an amount asked is calculated on the basis of a count value of the total counter and a predetermined calculation expression, and printer 94a is activated to print it out.

Figure 18:
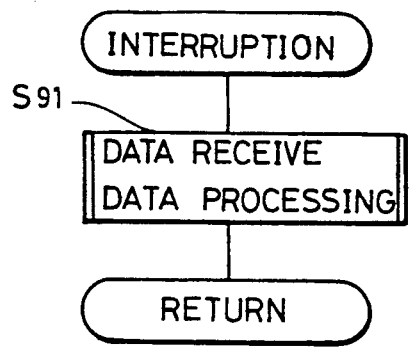
FIG. 18 is a flow chart showing an interruption process for CPU 91a of the center A device.
Figure 19:
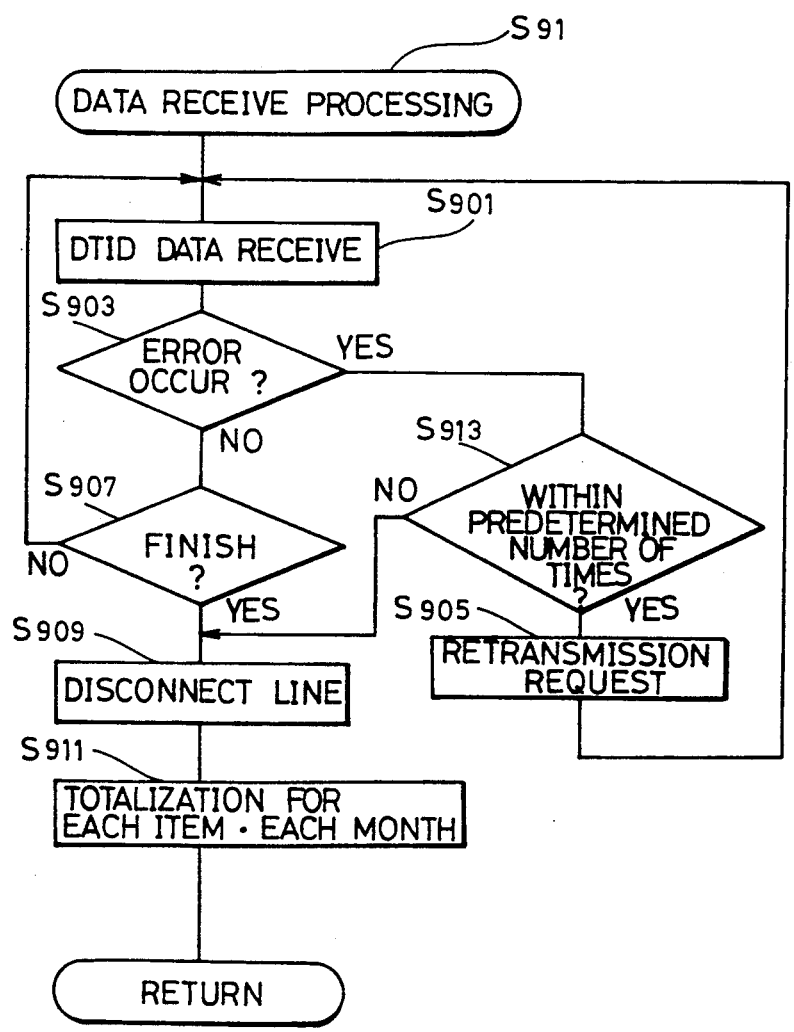
FIG. 19 is a flow chart showing specific contents of the interruption process routine of FIG. 18.

(b) Interruption Process (FIGS. 16 through 18)

CPU 91 receives data transmitted from a DT by an interruption process, and also applies a predetermined process to the received data (S91).

First, when an interruption takes place by receipt from the communication line, a DTID transmitted from the data terminal side is received and the DTID is confirmed, and then various data are received (S901).

When a communication error occurs (YES in S903), on the condition that the number of occurrences of error is equal to or less than a predetermined number of times (YES in S913), request of retransmission of data is made to the data terminal side (S905).

When the number of times of error occurrences exceeds the predetermined number of times (NO in S913), the communication line to the data terminal is disconnected (S909).

When communication with the data terminal has been normally finished (YES in S907), the communication line to the data terminal is disconnected (S909), and totalization is made for each item and for each month to produce data to be displayed on a screen by an operator's selection (S911).

As described above, processings in CPUs of copying machines, CPUs of data terminals, CPU 61 of transmission controller 6 and CPU at the control center are performed, and the present system in which each user and the center which is a management party are connected by the communication line is controlled.

Next, the second embodiment of the present invention will be described.

Figure 20:
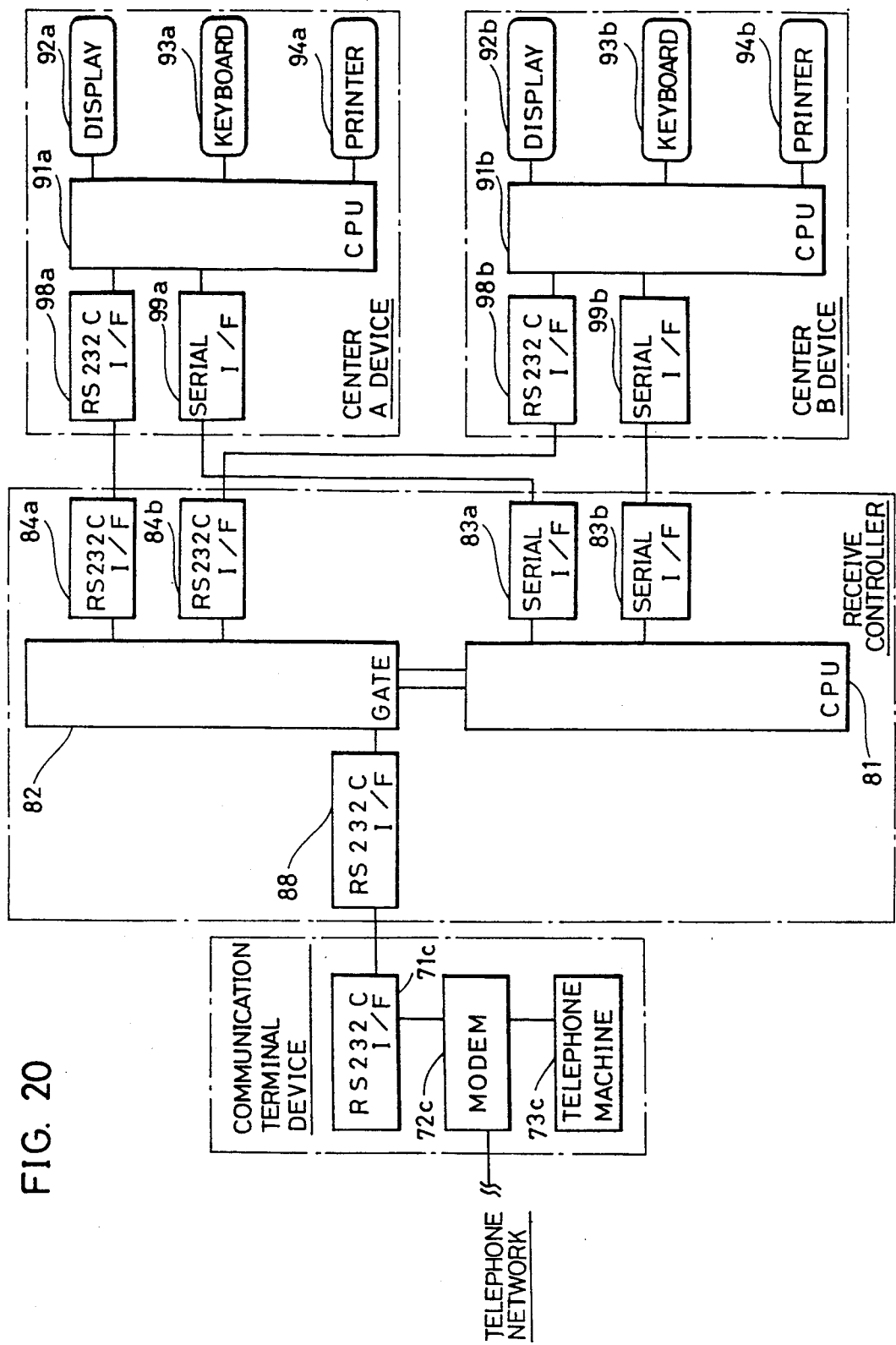
FIG. 20 is a block diagram showing circuit structure of a copying machine control system according to the second embodiment of the present invention.
Figure 14:
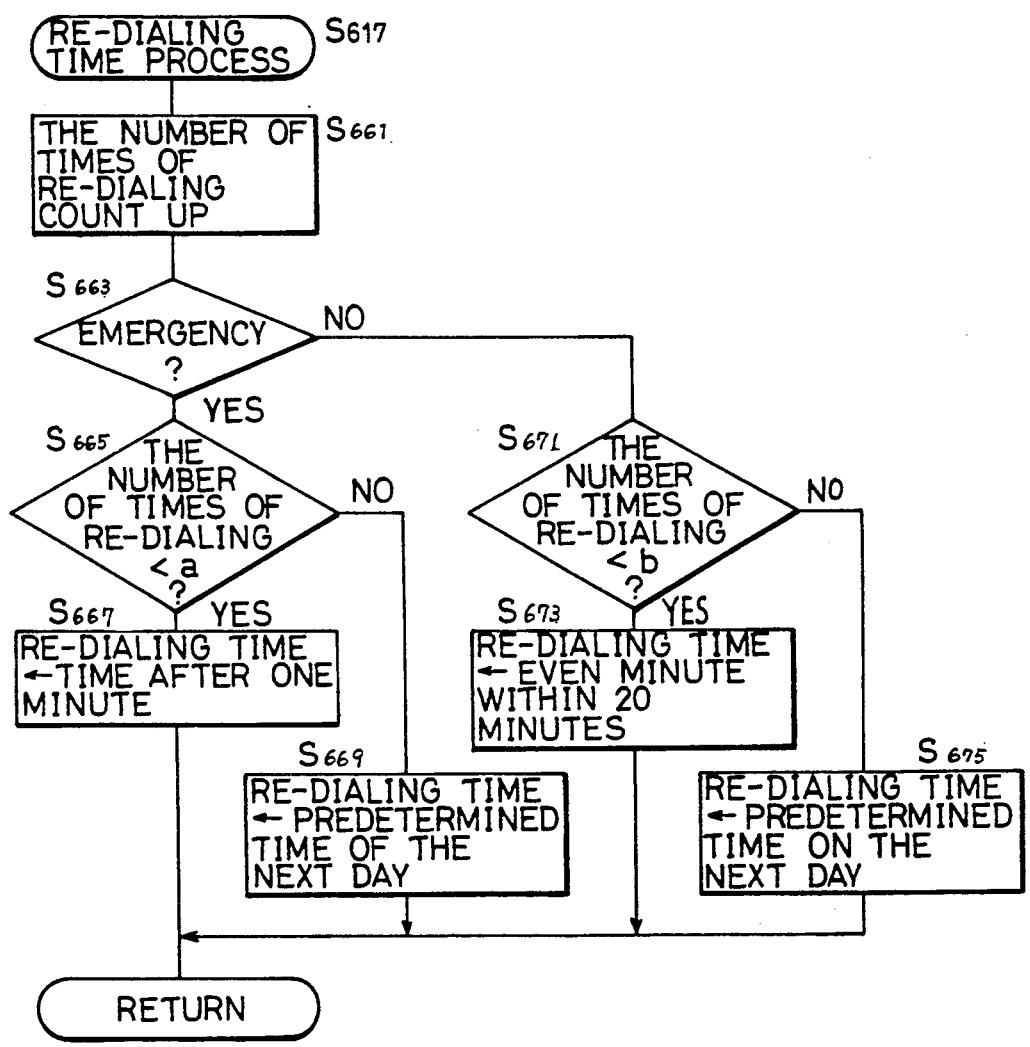
FIG. 14 is a flow chart showing specific contents of the re-dialing time process routine of FIG. 13C.

Although the center A device and the center B device at the control center include communication terminal devices (modems 72a, 72b) independent of each other in the above-described embodiment, a common communication terminal device may be provided as shown in FIG. 20.

In this case, corresponding to the contents of data received by a modem 72c of the communication terminal device, a receipt controller 80 transmits the data to the center A device or the center B device.

The receipt controller 80 includes a gate 82 which opens and closes connection between modem 72c side and the center equipment and, a CPU 81 controlling operation of gate 82. CPU 81 is connected to the serial I/Fs 99a and 99b on the center equipment side through the serial I/Fs 83a, 83b. Gate 82 is connected to a communication interface 71c of the communication terminal device through a communication interface 88 and also connected to communication interfaces 98a and 98b on the center equipment side through communication interfaces 84a and 84b. When the data received by modem 72c of the communication terminal device is normal one, it is transmitted to the center A device and if it is one for emergency, it is transmitted to the center B device. A function of the receipt controller may be provided in modem 72c.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A copying machine control system including a plurality of data terminals for collecting data related to a plurality of copying machines, respectively, a centralized control unit communicating data with the respective data terminals through a communication network, and a communication control unit connecting the plurality of data terminals an the communication network, wherein:

each data terminal comprises:
requesting means for requesting to said communication control unit communication with said centralized control unit when one of a plurality of predetermined transmission conditions occurs, each of said predetermined transmission conditions having a predetermined priority assigned thereto so that said predetermined transmission conditions include at least one condition with a high priority and one condition with a low priority, transmitting means for transmitting the predetermined priority of the predetermined transmission condition which as occurred to said communication control unit, and communicating means for communicating with said centralized control unit when communication with said centralized control unit is permitted by said communication control unit, and said communication control unit comprises:
first controlling means for, when communication is requested from only one of said data terminals, permitting the data terminal which requests the communication to communicate with said centralized control unit, and second controlling means for, when communications are requested from a plurality of said data terminals, permitting a data terminal which requests the communication with the highest priority of predetermined transmission condition to communicate with said centralized control unit.

2. The copying machine control system according to claim 1, wherein the transmitting means of each of the data terminals transmits identification information assigned to each data terminal to said communication control unit.

3. The copying machine control system according to claim 2, wherein said communication control means comprises storing means for storing the priority of the predetermined transmission condition and the identification information transmitted from each of the data terminals in correspondence with each other.

4. The copying machine control system according to claim 1, wherein, when there exists a data terminal being in communication with said centralized control unit and also communication is requested from another data terminal, if the priority of said another data terminal is higher than the priority of the data terminal being in communication, the second control means of said communication control unit interrupts communication between the data terminal being communicating and said centralized control unit.

5. A copying machine control unit for collecting data related to a plurality of copying machines and communicating with a centralized control unit through a communication network, comprising:

a plurality of communication means, one provided for each of said copying machines, for communicating with said centralized control unit when one of a plurality of predetermined transmission conditions occurs, each of said predetermined transmission conditions having a predetermined priority assigned thereto so that said predetermined transmission conditions include at least one condition with a high priority and one condition with a low priority;

permitting means for permitting one of said communication means to communicate with said centralized control unit;

forbidding means for forbidding communication between said centralized control unit and communication means other than the communication means which is permitted by said permitting means; and wherein each of said communication means transmits the priority of the predetermined transmission condition which as occurred and said permitting means permits one of said communication means to communicate with said centralized control unit according to the priority transmitted.

6. The copying machine control unit according to claim 5, wherein each of said communication means transmits identification information assigned to each of said communication means to said permitting means.

7. The coping machine control unit according to claim 5, wherein said forbidding means includes interrupting means for interrupting communication between said centralized control unit and the communication means which is in communication with said centralized control unit.

8. A copying machine control system comprising:
a central control unit;
a plurality of copying machines;
data terminal means associated with each of said copying machines for receiving a signal indicating a change in an operating condition of the associated copying machine and transmitting a preassigned priority code associated with the change in operating condition to the central control unit to request communication therewith; and
permitting means for permitting said data terminal means to establish communication with the central control unit and transmit data indicating the change in operating condition on the basis of the transmitted priority code.

9. A copying machine control system according to claim 8, wherein said permitting means permits a data terminal means transmitting the highest priority code to establish communication with the central control unit.

* * * * *